(12) United States Patent
Vella

(10) Patent No.: US 12,077,090 B2
(45) Date of Patent: *Sep. 3, 2024

(54) DEVICE FOR STRAPPING A LOAD AT HEIGHTS

(71) Applicant: GROWNRIGHT PTY LIMITED, Leppington (AU)

(72) Inventor: John Vella, Leppington (AU)

(73) Assignee: GROWNRIGHT PTY LIMITED, New South Wales (AU)

( * ) Notice: Subject to any disclaimer, the term of this patent is extended or adjusted under 35 U.S.C. 154(b) by 9 days.

This patent is subject to a terminal disclaimer.

(21) Appl. No.: 17/889,828

(22) Filed: Aug. 17, 2022

(65) Prior Publication Data

US 2022/0388442 A1 Dec. 8, 2022

Related U.S. Application Data

(62) Division of application No. 16/759,473, filed as application No. PCT/AU2018/000212 on Oct. 30, 2018, now Pat. No. 11,453,327.

(30) Foreign Application Priority Data

Oct. 31, 2017 (AU) ................. 2017904417

(51) Int. Cl.
*B60P 7/08* (2006.01)

(52) U.S. Cl.
CPC .......... *B60P 7/0853* (2013.01); *B60P 7/0823* (2013.01)

(58) Field of Classification Search
CPC ......... B60P 7/0853; B60P 7/0823; B60P 7/04; B60P 7/16; F41B 3/04; A47F 13/06

(Continued)

(56) References Cited

U.S. PATENT DOCUMENTS

| 4,385,849 A | 5/1983 | Crain |
| 6,729,358 B1 | 5/2004 | Moffatt |

(Continued)

FOREIGN PATENT DOCUMENTS

| EP | 2792545 A2 | 10/2014 |
| SE | 469422 B | 7/1993 |

(Continued)

OTHER PUBLICATIONS

International Search Report dated Feb. 15, 2019 for corresponding International Application No. PCT/AU/2018/000212.

*Primary Examiner* — Stephen T Gordon
(74) *Attorney, Agent, or Firm* — Tarolli, Sundheim, Covell & Tummino LLP

(57) ABSTRACT

A load strapping device (10) has a first elongated member (12) having a first end (14), a second elongated member (16) having a second end (18) and a pivot assembly (20) interconnecting the first and second ends. A strap end receiving assembly (22) is connected to a free end (24) of one of the elongated member (16). For use, one end of a strap (40) is engaged to the strap end receiving assembly. A load strapping arrangement over a load (44) is formed when a user, located at one side of the load, grips the device and lifts the one end of the strap to a first position just above the height of the load. From this position, the one end of the strap, by pivotal manipulation of the elongated members, is then fed over the top of the load until the one end of the strap reaches a second position at the other side of the load. After this position is reached, the one end of the strap is disengaged from the strap end receiving assembly and the device is withdrawn from the top of the load. This allows the one end of the strap and another end of the strap to be securely attached to respective anchor points for strapping over the load.

17 Claims, 28 Drawing Sheets

(58) Field of Classification Search
USPC .............................. 410/97, 98, 99, 100, 156
See application file for complete search history.

(56) References Cited

U.S. PATENT DOCUMENTS

| | | | |
|---|---|---|---|
| 7,306,275 B2* | 12/2007 | Kalous | B60D 1/60 |
| | | | 296/1.07 |
| 8,459,912 B2 | 6/2013 | Siegenthaler | |
| 9,126,521 B1 | 9/2015 | McCullough | |
| 11,091,086 B2 | 8/2021 | Villanueva | |
| 11,453,327 B2* | 9/2022 | Vella | B60P 7/0853 |
| 2004/0052604 A1 | 3/2004 | Lambie | |
| 2006/0153657 A1 | 7/2006 | Goulet | |
| 2006/0216128 A1* | 9/2006 | Hartman | B60P 7/0823 |
| | | | 410/98 |
| 2009/0274530 A1 | 11/2009 | Goodfellow | |
| 2010/0028100 A1 | 2/2010 | Lampman | |

FOREIGN PATENT DOCUMENTS

| | | |
|---|---|---|
| SE | 512562 C2 | 4/2000 |
| SE | 517438 C2 | 6/2002 |
| WO | 2011126380 A1 | 10/2011 |
| WO | 2016011497 A1 | 1/2016 |

\* cited by examiner

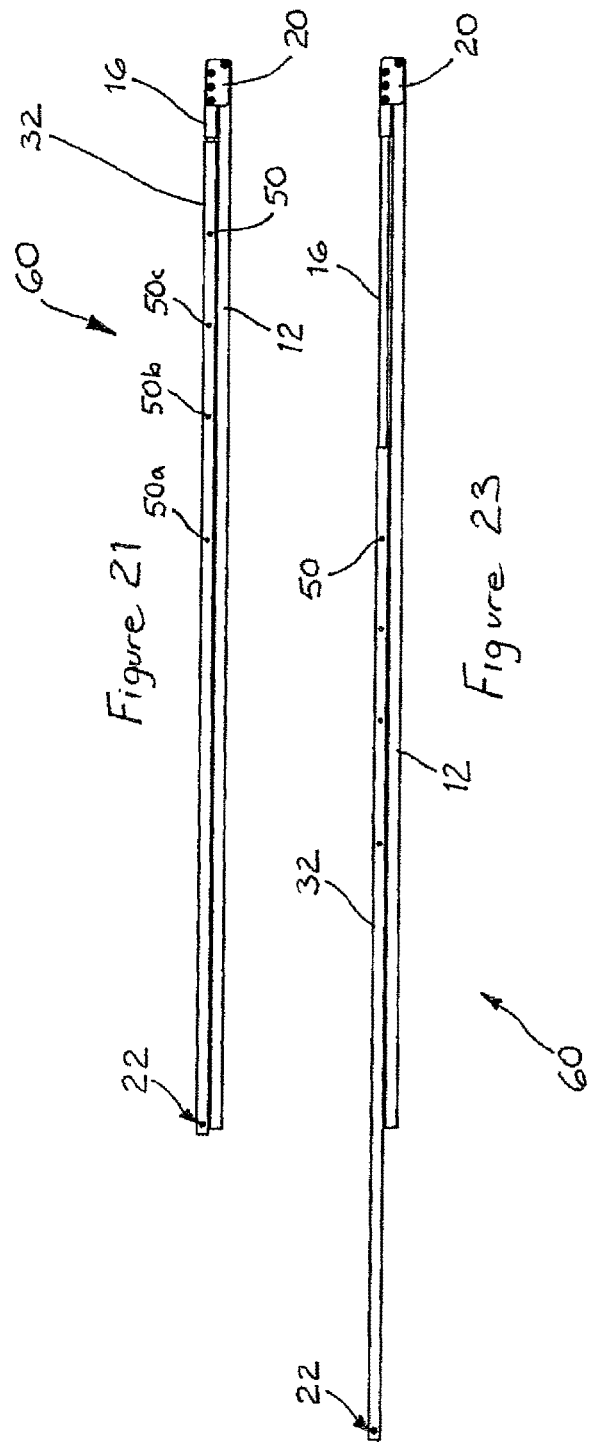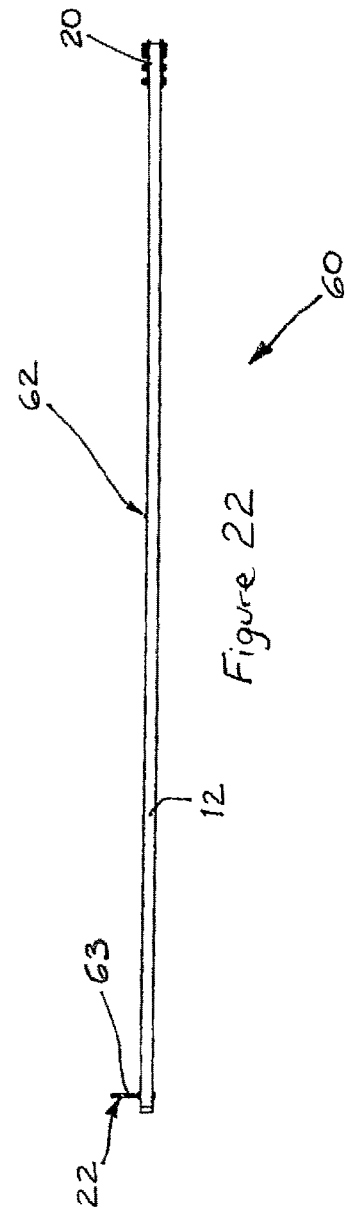

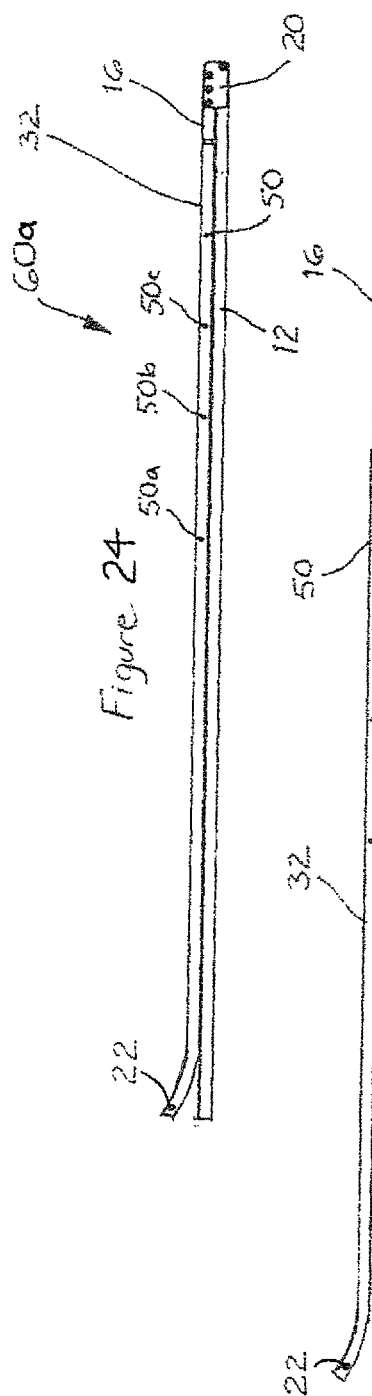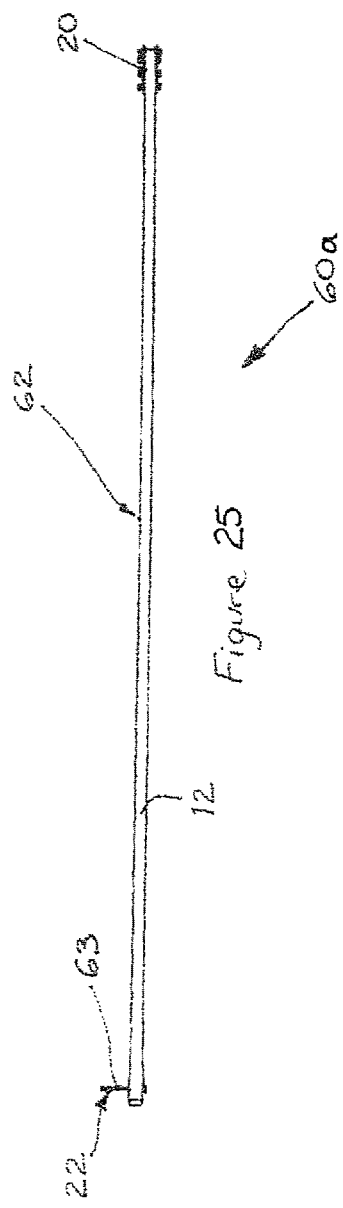

DEVICE FOR STRAPPING A LOAD AT HEIGHTS

RELATED APPLICATIONS

The present application is a divisional of U.S. application Ser. No. 16/759,473, filed on 27 Apr. 2020; which is a U.S. National Stage application under 35 USC 371 of PCT Application Serial No. PCT/AU2018/000212, filed on 30 Oct. 2018; which claims priority from AU Patent Application No. 2017904417, filed 31 Oct. 2017, the entirety of each of which are incorporated herein by reference.

TECHNICAL FIELD

The present invention relates to a device for use in strapping a load at heights and to a load strapping procedure which utilizes such a device.

BACKGROUND ART

The loading and transportation of large objects on a truck requires that the objects be properly strapped, or otherwise restrained, to the tray or platform onto which they are loaded to prevent unwanted movement and avoid the risk of the objects falling from the truck.

The strapping of tall objects, such as storage racks, to a tray of a truck may be achieved by simply throwing one end of a strap over the object and grabbing that end as it hangs over the other side of the object, and then completing the load strapping procedure to anchor points on the truck. However, there is a risk that a person standing on the other side of the object may be struck by the thrown strap end and suffer an injury, and this may be exacerbated by the presence of a metal hook or other hard anchoring device connected at that end.

There is also a possibility that the strap may be twisted over the top of the object and, if left uncorrected, the twisted strap may compromise the effectiveness of the load strapping procedure. The likelihood of a twisted strap being present over such a strapped object is heightened by the inability of the person(s) throwing and grabbing the strap to observe, from ground level, the orientation of the strap on the top of the object.

Similar problems can arise when it is necessary to pass a strap through a small space between the top of the object and, say, the roof of a tautliner body of a truck.

To address such problems, it is a not uncommon practice for a person to climb onto the truck, and even onto the loaded object itself, in the course of the load strapping procedure. Such a practice is both time consuming and, more importantly, creates a risk of serious injury should the person fall to the ground.

To avoid such workplace accidents, a safer approach to the strapping of loads at heights has involved the use of forklifts or other automated lifting devices, but this solution may only be effective in circumstances where these devices are readily available for use, or are structurally suited to reach the desired height and to extend across the top of the loaded object. Forklifts, for example, are not designed or best suited for this purpose and they may be more beneficially used elsewhere if a simpler and still safe approach to the strapping of loads at heights can be found. Furthermore, the operation of a forklift requires an additional person and the use of approved and compatible safety cages, which add to the cost of the load strapping procedure.

DISCLOSURE OF INVENTION

Accordingly, it is an object of the present invention to provide a device for use in strapping a load at heights which is simple, safe to use, and effective in ensuring that a strap is not twisted over the top of the load and the load strapping procedure can be completed correctly, safely and efficiently.

According to a broad form of the present invention, there is provided a load strapping device comprising:
(a) a first elongated member having a first end,
(b) a second elongated member having a second end,
(c) a pivot assembly interconnecting the first and second ends, and
(d) a strap end receiving assembly connected to a free end of one of the elongated members, wherein, for use, one end of a strap is engaged to the strap end receiving assembly, and wherein a load strapping arrangement over a load is formed when a user, located at one side of the load, grips the device and lifts the one end of the strap to a first position just above the height of the load, from where the one end of the strap, by pivotal manipulation of the elongated members, is then fed over the top of the load until the one end of the strap reaches a second position at the other side of the load, whereafter the one end of the strap is disengaged from the strap end receiving assembly and the device is withdrawn from the top of the load to allow the one end of the strap and another end of the strap to be securely attached to respective anchor points for strapping over the load.

According to another aspect of the present invention, there is provided a process for strapping a load at heights, the process comprising:
(a) providing a load strapping device according to the broad form, as described above,
(b) engaging one end of a strap to the strap end receiving assembly,
(c) forming a load strapping arrangement over the load by the steps of:
(i) a user, located at one side of the load, gripping the device and lifting the one end of the strap to a first position just above the height of the load,
(ii) pivotally manipulating the elongated member so that the one end of the strap is fed over the top of the load until the one end of the strap reaches a second position at the other side of the load,
(iii) disengaging the one end of the strap from the strap end receiving assembly,
(iv) withdrawing the device from the top of the load, and
(v) securely attaching the one end of the strap and another end of the strap to respective anchor points for strapping over the load.

Preferably, the process further comprises, between step (iv) and step (v) as described above, the steps of the or another user, located at the other side of the load, gripping the device and re-engaging the one end of the strap to the strap end receiving assembly and lowering the one end of the strap to a position from where it can be anchored.

Preferably, the device further comprises a third elongated member telescopically extendible from the second elongated member to an extended position remote of the pivot assembly, and an extension lock assembly for at least temporarily locking the third elongated member in the extended position, the strap end receiving assembly being connected to a free end of the third elongated member, and further wherein, for use, the third elongated member is removably locked in the extended position.

In a preferred form, the third elongated member is telescopically extendible to the extended position by sliding over the second elongated member.

It is preferred that the extension lock assembly comprises a first aperture in the second elongated member, at least one second aperture in the third elongated member, and a pin which, in use, is located through both the first aperture and the, or a selected, second aperture for removably locking the third elongated member in the extended position.

Preferably, the pin is a quick release pin or a dowel pin that is insertable into, and removable from, both of the first and second apertures, and when inserted through both of the first and second apertures is secured in position by an R-shaped spring clip engaged within a hole extending laterally within the pin.

Alternatively, the pin is a spring movable lock pin which is secured to the second elongated member and is extended outwardly through the first aperture when the pin is under spring tension, and is retracted inwardly from the first aperture when the pin is under spring compression exerted by a pressure applied by the third elongated member on the pin, and wherein the pin projects outwardly through the, or a selected, second aperture for removably locking the third elongated member in the extended position.

It is preferred that there is a plurality of second apertures which are regularly spaced apart in the third elongated member.

The strap end receiving assembly preferably comprises a rod extending perpendicularly from a longitudinal axis of the third elongated member, the rod having a length sufficient to receive therearound a looped end of the strap.

According to a preferred form of the present invention, there is provided a device for use in strapping a load at heights, the device comprising:
(a) a first elongated member having a first end,
(b) a second elongated member having a second end,
(c) a pivot assembly interconnecting the first and second ends,
(d) a third elongated member telescopically extendible from the second elongated member to an extended position remote of the pivot assembly,
(e) an extension lock assembly for at least temporarily locking the third elongated member in the extended position, and
(f) a strap end receiving assembly connected to a free end of the third elongated member, wherein, for use, the third elongated member is locked in the extended position, and one end of a strap is engaged to the strap end receiving assembly, and wherein a load strapping arrangement over a load is formed when a user, located at one side of the load, grips the device and lifts the one end of the strap to a first position just above the height of the load, from where the one end of the strap, by pivotal manipulation of the elongated members, is then fed over the top of the load until the one end of the strap reaches a second position at the other side of the load, whereafter the one end of the strap is disengaged from the strap end receiving assembly and the device is withdrawn from the top of the load to allow the one end of the strap and another end of the strap to be securely attached to respective anchor points for strapping over the load.

According to yet another aspect of the present invention, there is provided a process for strapping a load at heights, the process comprising:
(a) providing a load strapping device according to the preferred form, as described above,
(b) locking the third elongated member in the extended position,
(c) engaging one end of a strap to the strap end receiving assembly,
(d) forming a load strapping arrangement over the load by the steps of:
  (i) a user, located at one side of the load, gripping the device and lifting the one end of the strap to a first position just above the height of the load,
  (ii) pivotally manipulating the elongated member so that the one end of the strap is fed over the top of the load until the one end of the strap reaches a second position at the other side of the load,
  (iii) disengaging the one end of the strap from the strap end receiving assembly,
  (iv) withdrawing the device from the top of the load, and
  (v) securely attaching the one end of the strap and another end of the strap to respective anchor points for strapping over the load.

Preferably, the process further comprises, between step (iv) and step (v) as described above, the steps of the or another user, located at the other side of the load, gripping the device and re-engaging the one end of the strap to the strap end receiving assembly and lowering the one end of the strap to a position from where it can be anchored.

BRIEF DESCRIPTION OF THE DRAWINGS

In order that the invention may be more readily understood and put into practical effect, reference will now be made to the accompanying drawings, which are summarized as follows.

FIG. 21 is a plan view of a load strapping device according to yet another embodiment of the present invention, when the device is not in use and is in a flat packed storage configuration.

FIG. 22 is a side view of the load strapping device of FIG. 21.

FIG. 23 is a plan view of the load strapping device of FIGS. 21 and 22 after having been locked in the extended position.

FIG. 24 is a plan view of a load strapping device according to a still further embodiment of the present invention, when the device is not in use and is in a flat packed storage configuration.

FIG. 25 is a side view of the load strapping device of FIG. 24.

FIG. 26 is a plan view of the load strapping device of FIGS. 24 and 25 after having been locked in the extended position.

MODES FOR CARRYING OUT THE INVENTION

Figure 1:
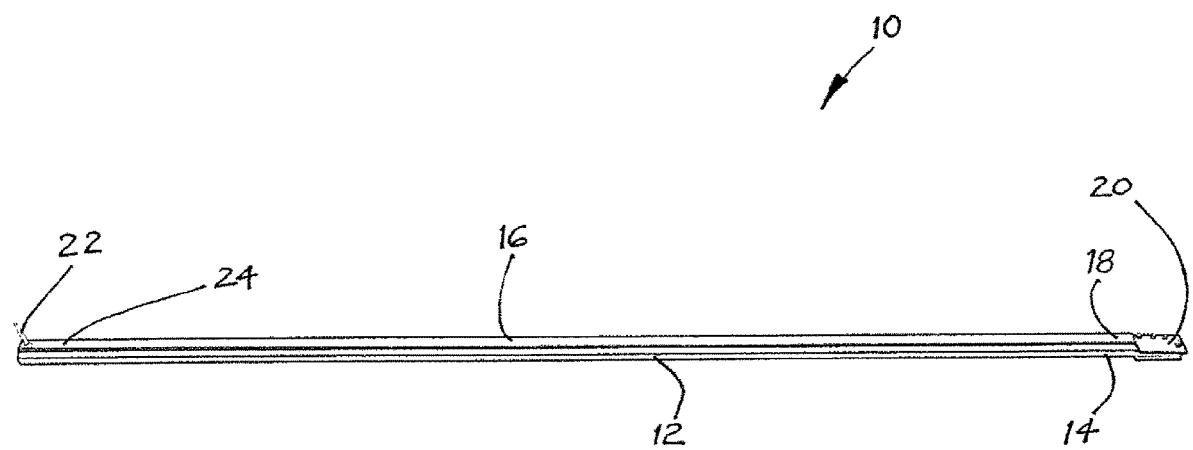
FIG. 1 is a perspective view of a load strapping device according to one embodiment of the present invention, when the device is not in use and is in a flat packed storage configuration.

An embodiment 10 of a load strapping device, when not in use, is shown in FIG. 1 in a flat packed storage configuration. The device 10 has a first elongated member 12 with a first end 14 and has a second elongated member 16 with a second end 18. A pivot assembly 20 interconnects the first and second ends 14, 18. There is a strap end receiving assembly 22 connected to a free end of one of the elongated members which, in this embodiment, is the free end 24 of elongated member 16. In this embodiment, the free end 24 is a straight end, but in an otherwise similar alternative embodiment, the free end 24 is an upwardly curved end, such as will be described shortly with reference to a load strapping device 30a.

The first and second elongated members 12, 16 are only capable of pivotal movement about the pivot assembly 20, and they define a pair of pivotal arms which are of fixed and substantially identical lengths.

For use, one end of a strap (not shown for this embodiment) is engaged to the strap end receiving assembly 22.

The forming of a load strapping arrangement over a load by a user manipulating the device 10 in a series of steps will be described by reference to a load strapping procedure which utilises another embodiment 30 of a load strapping device shown in FIGS. 2A to 20. The load strapping device 30 has additional structural and functional features to those of the load strapping device 10, and so the load strapping procedure utilizing the device 10 is to be understood on the basis that the device 10 is capable of performing only those steps of such a procedure which its simpler structure and function, and like features, allow. Such like features between the devices 10 and 30 will be identified by like numerals in the description of the device 30 and the load strapping procedure which follows.

Figure 2A:
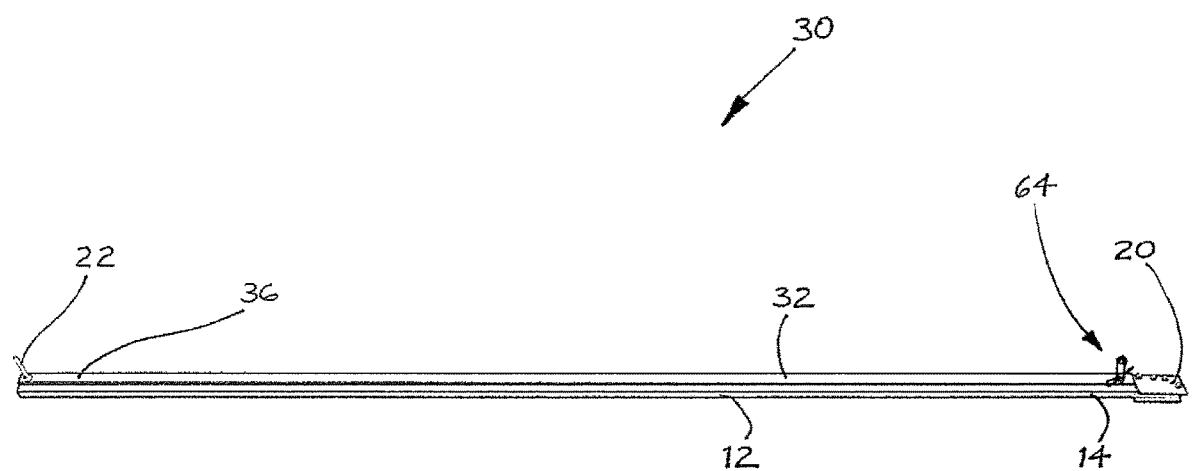
FIG. 2A is a perspective view of a load strapping device according to another embodiment of the present invention, when the device is not in use and is in a flat packed storage configuration.

The load strapping device 30, when not in use, is shown in FIG. 2A in a flat packed storage configuration. As shown in FIGS. 2A to 20, the device 30 has a first elongated member 12 with a first end 14 and has a second elongated member 16 (shown in FIGS. 4 to 8) with a second end 18. A pivot assembly 20 interconnects the first and second ends 14, 18.

Unlike the device 10, the device 30 has a third elongated member 32 which is telescopically extendible from the second elongated member 16 to an extended position remote of the pivot assembly 20. In addition, the device 30 has an extension lock assembly 34 (shown in FIGS. 7 and 8) for at least temporarily locking the third elongated member 32 in the extended position. Like the device 10, the device 30 has a strap end receiving assembly 22, but it is connected to a free end 36 of the third elongated member 32. In this embodiment, the free end 36 is a straight end, but in an otherwise similar alternative embodiment of a load strapping device 30a shown in FIG. 2B, the free end 36 is an upwardly curved end 36a. The upwardly curved end 36a enables that end of the device 30a to slide over certain obstacles in its path.

The first and second elongated members 12, 16 are capable of pivotal movement about the pivot assembly 20 and, because of the telescopically extendible third elongated member 32, they define a pair of pivotal arms which may have variable and substantially different lengths.

Figure 10A:
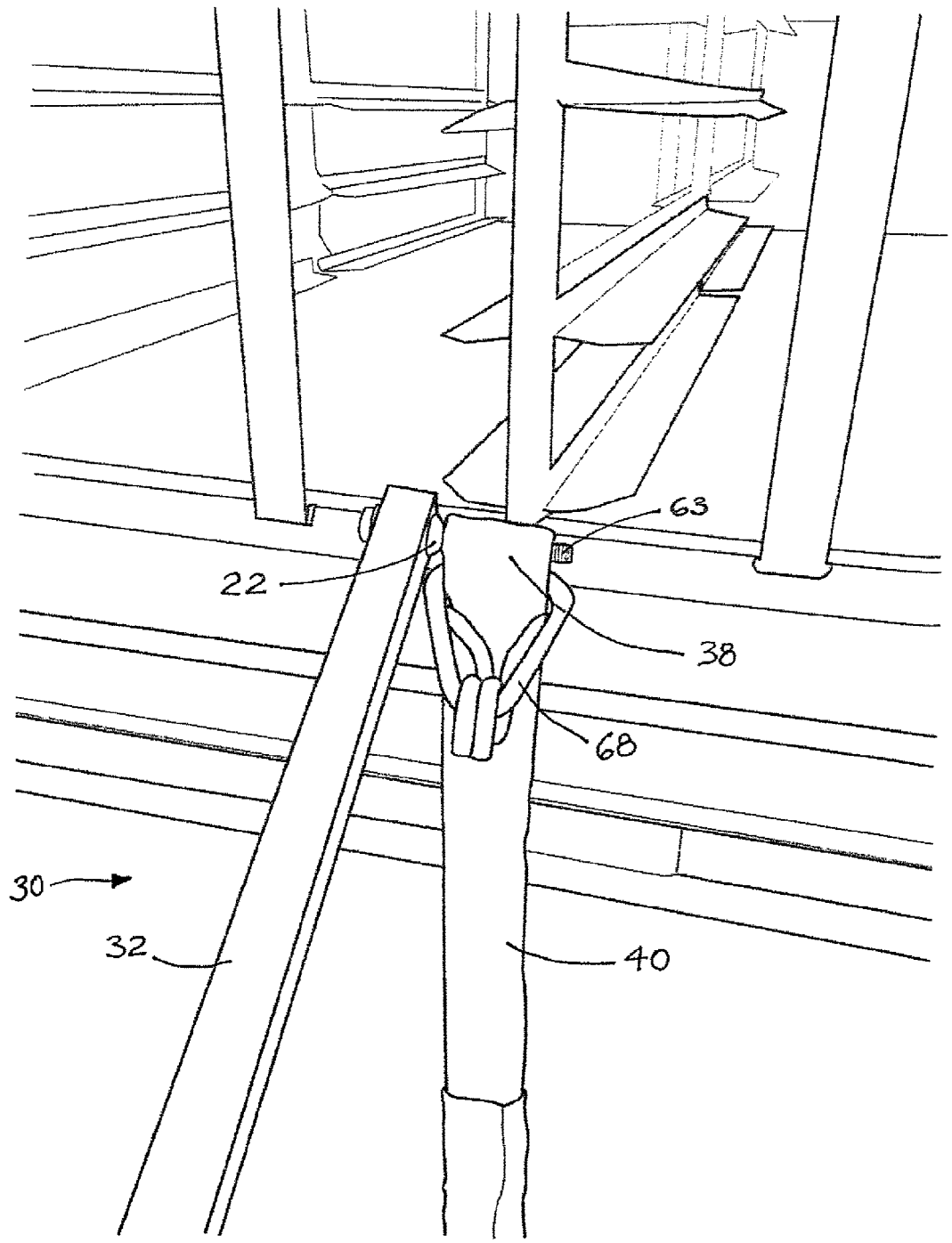
FIG. 10A is an enlarged perspective view of part of the device of FIG. 9A after receiving a strap end.
Figure 10B:
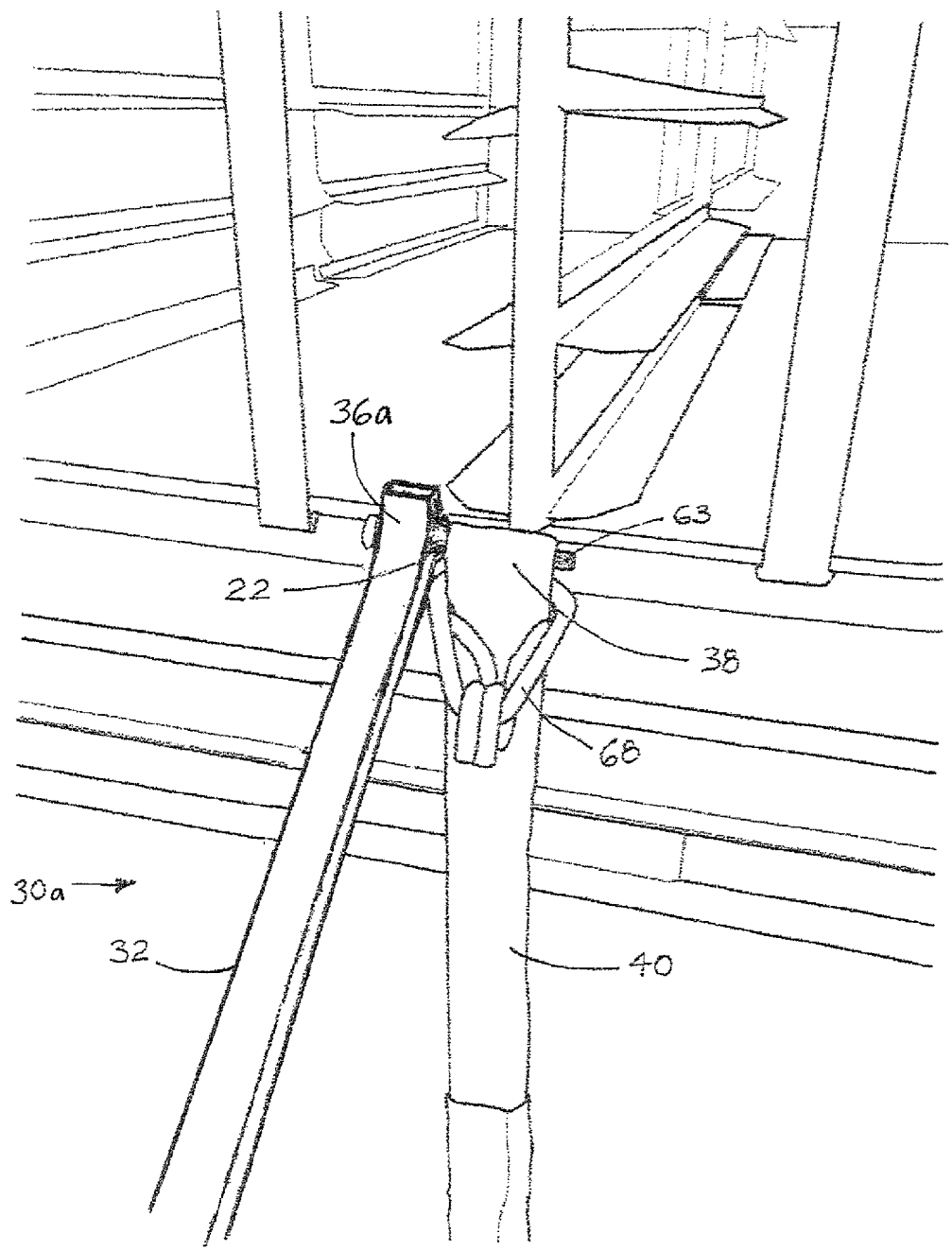
FIG. 10B is an enlarged perspective view of part of the device of FIG. 9B after receiving a strap end.

For use, and as shown in FIGS. 10A and 10B, one end 38 of a strap 40 is engaged to the strap end receiving assembly 22, and the third elongated member 32 is removably locked in the extended position.

Figure 2B:
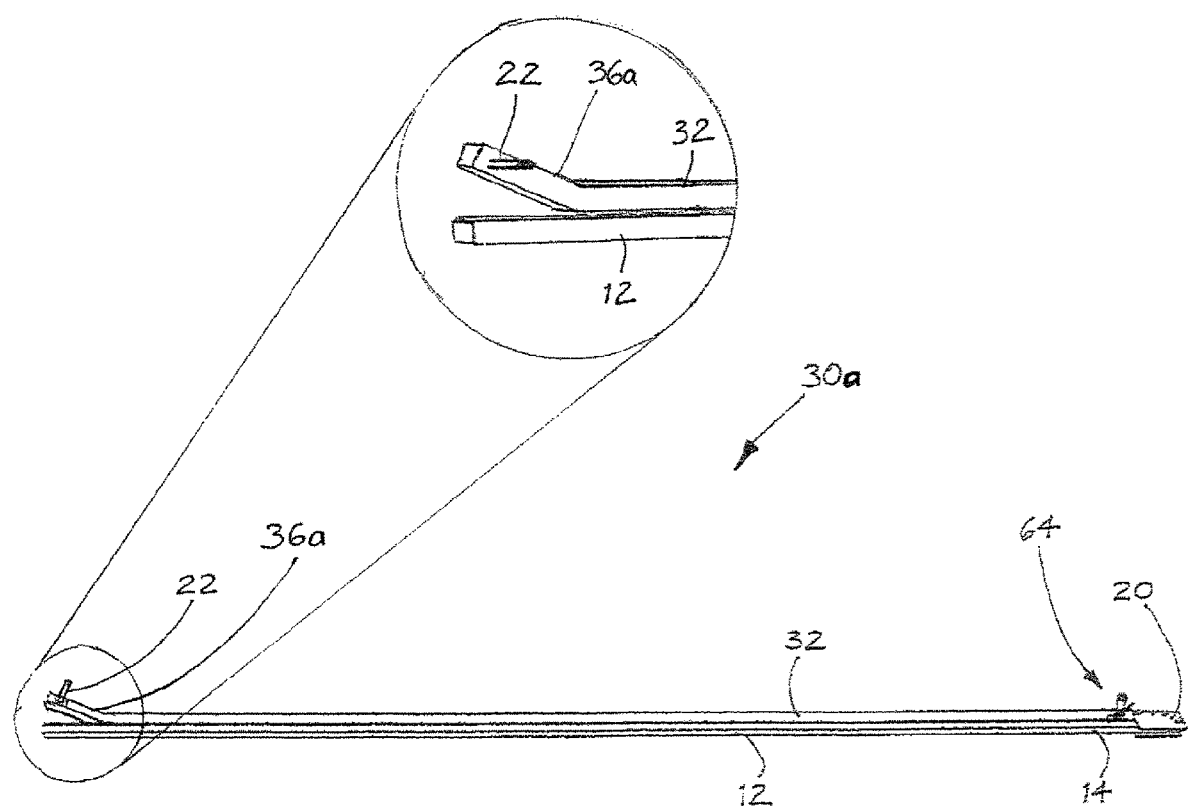
FIG. 2B is a perspective view of a load strapping device according to yet another embodiment of the present invention, when the device is not in use and is in a flat packed storage configuration.
Figure 11:
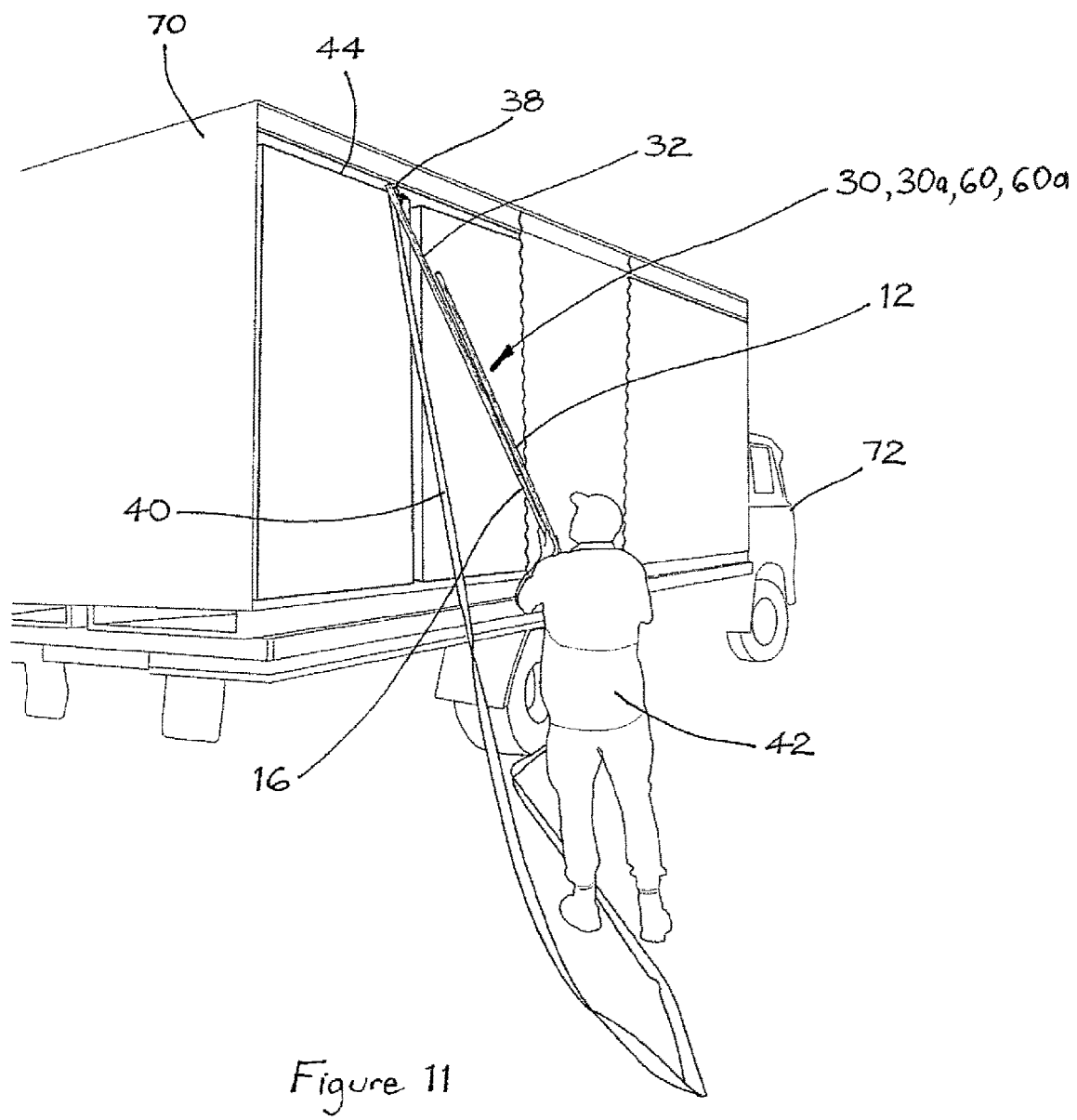
FIG. 11 is a perspective view showing the device of FIGS. 2A, 2B, 3B, 24 with a strap end received thereon and being in the first position at one side of a load mounted inside the tautliner body of a truck, the device being used in a first step of a load strapping procedure over the load.
Figure 12:
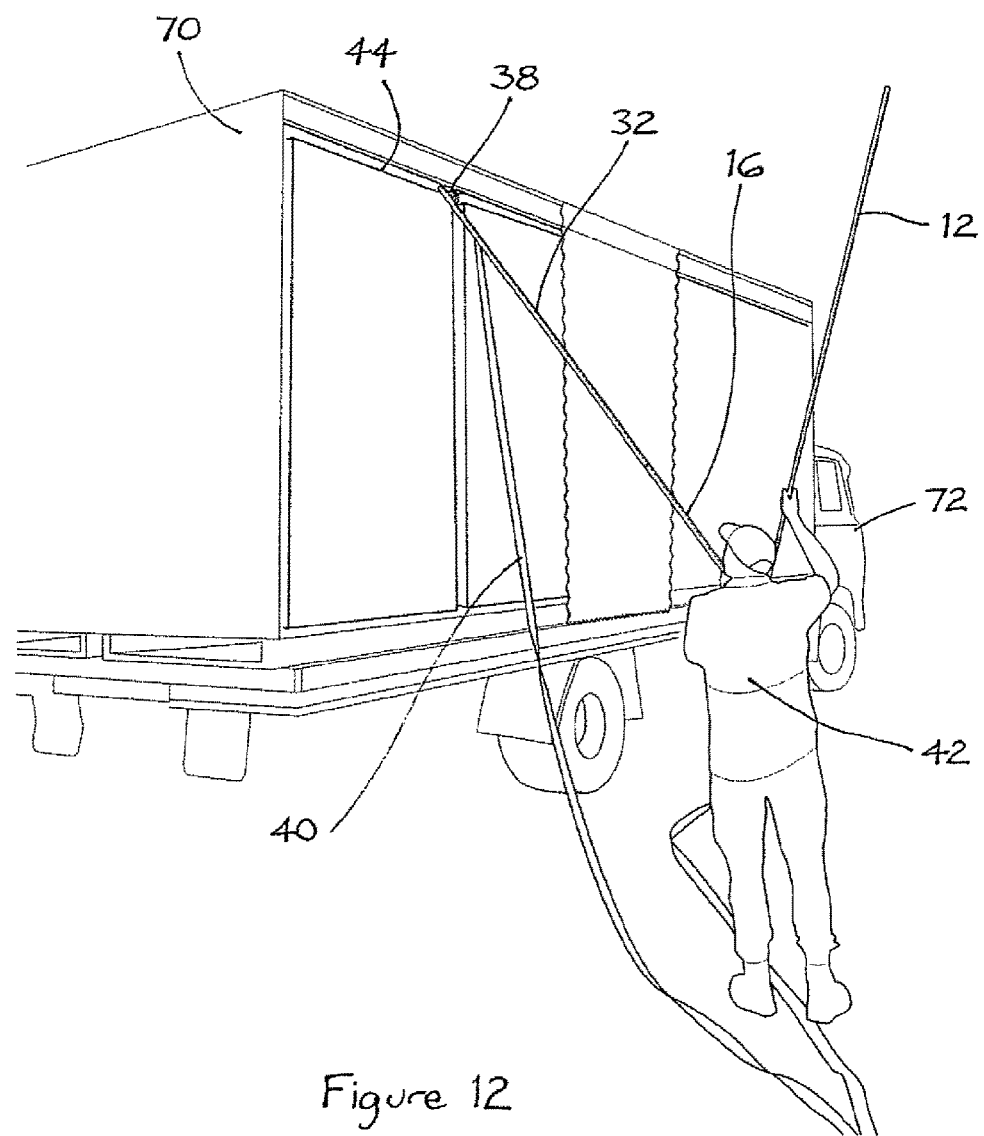
FIG. 12 is a perspective view showing a second step of the load strapping procedure.
Figure 13:
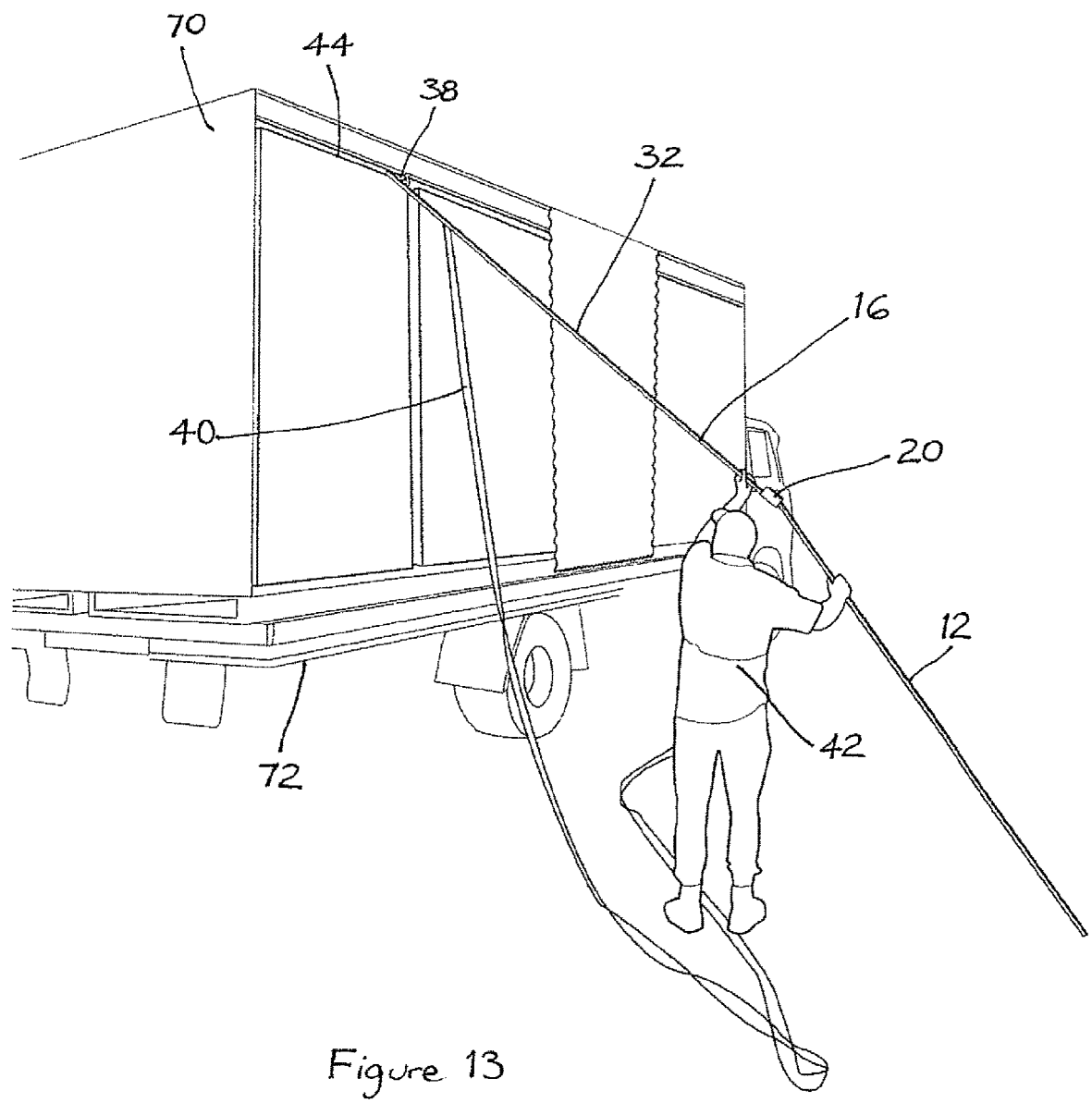
FIG. 13 is a perspective view showing a third step of the load strapping procedure.
Figure 14:
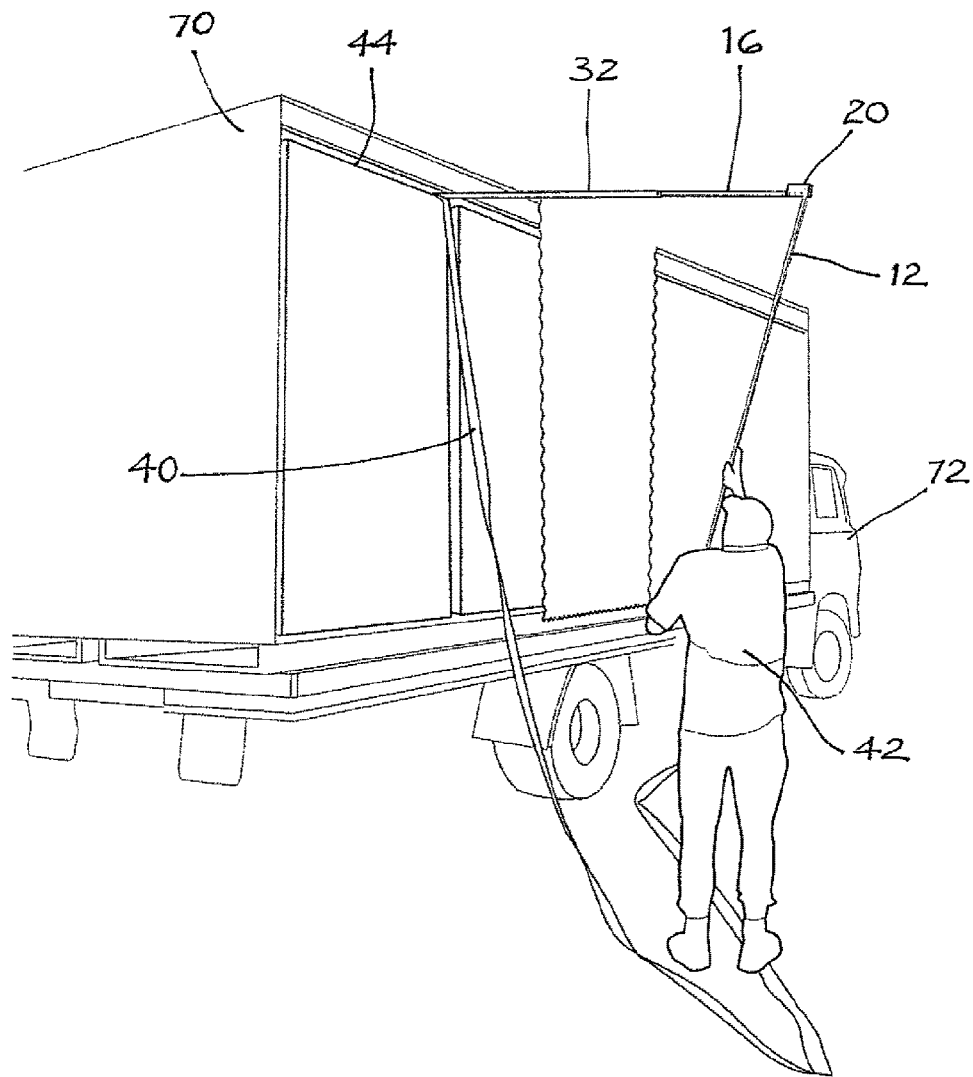
FIG. 14 is a perspective view showing a fourth step of the load strapping procedure.
Figure 15:
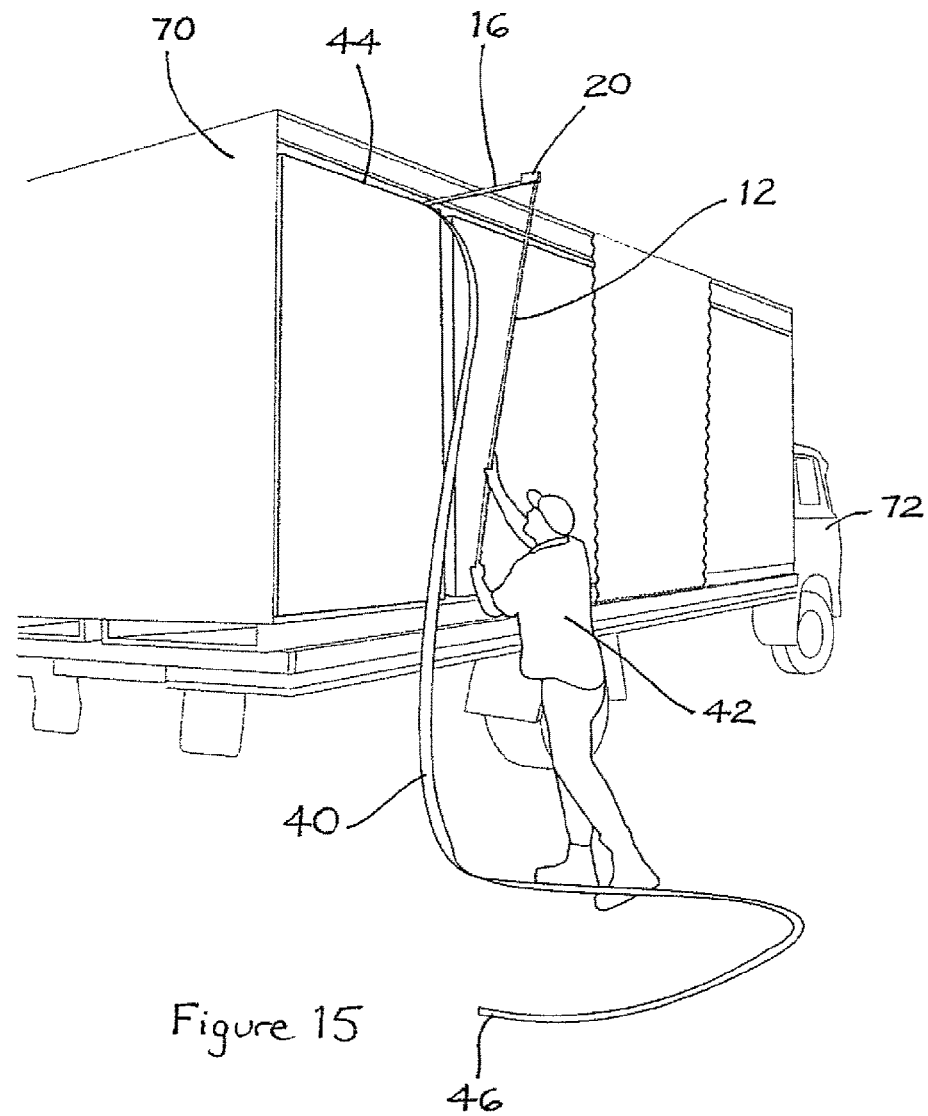
FIG. 15 is a perspective view showing a fifth step of the load strapping procedure.
Figure 16:
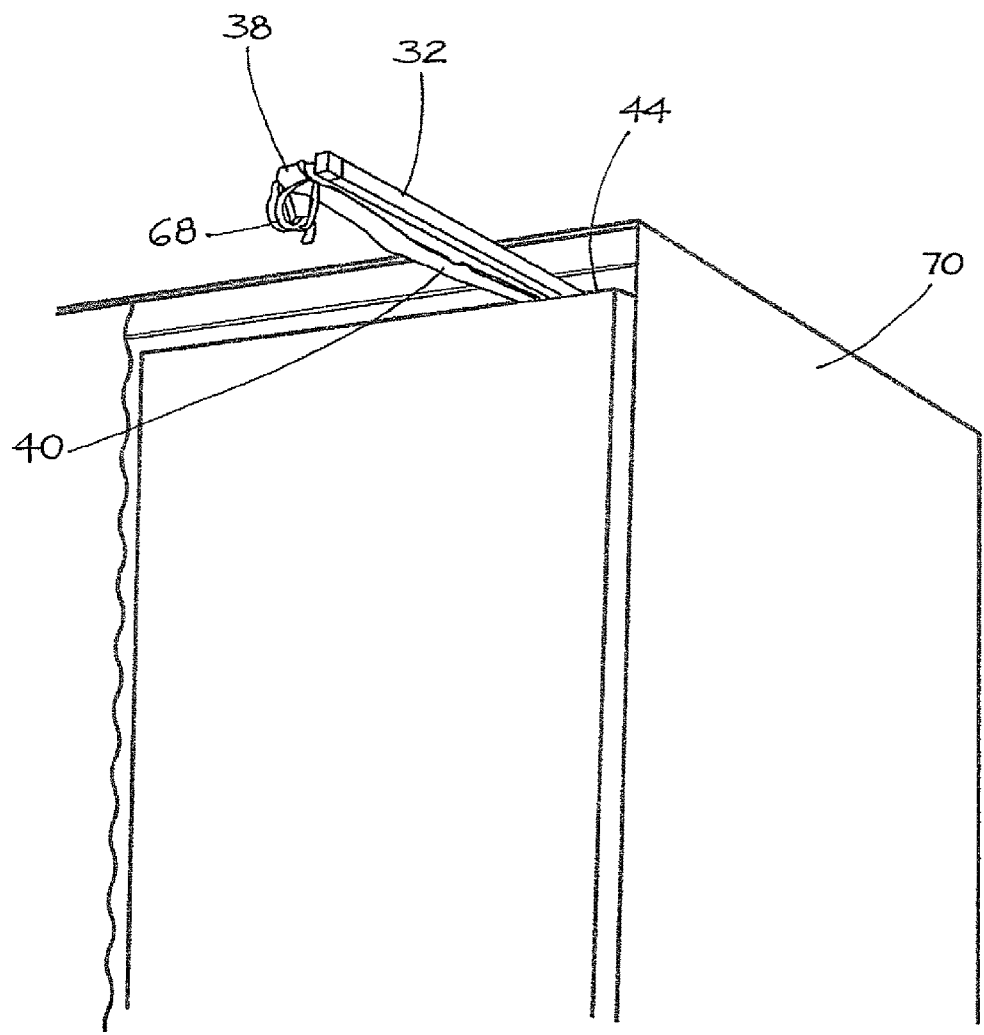
FIG. 16 is an enlarged perspective view showing the second position of the strap end at the other side of the load after the fifth step.
Figure 17:
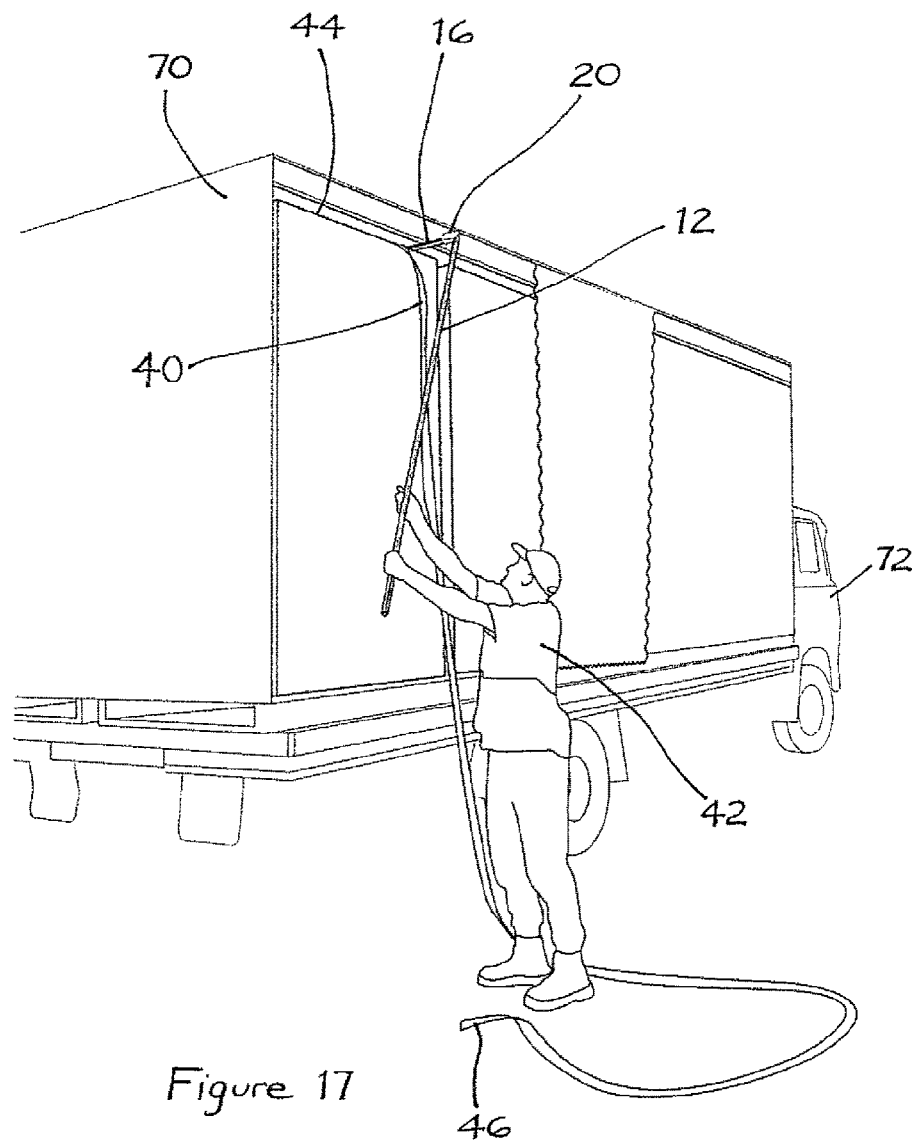
FIG. 17 is a perspective view showing a sixth step of the load strapping procedure.
Figure 18:
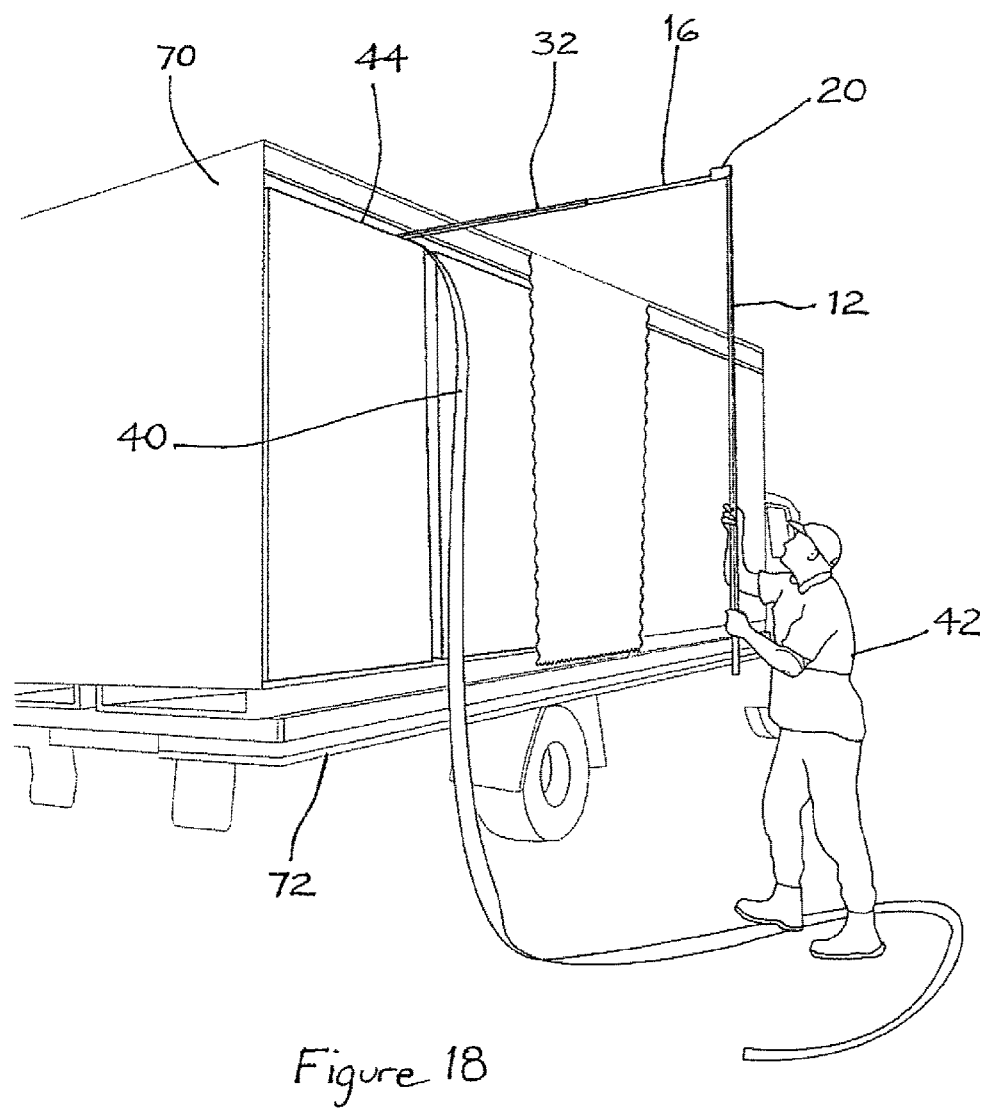
FIG. 18 is a perspective view showing a seventh step of the load strapping procedure.
Figure 19:
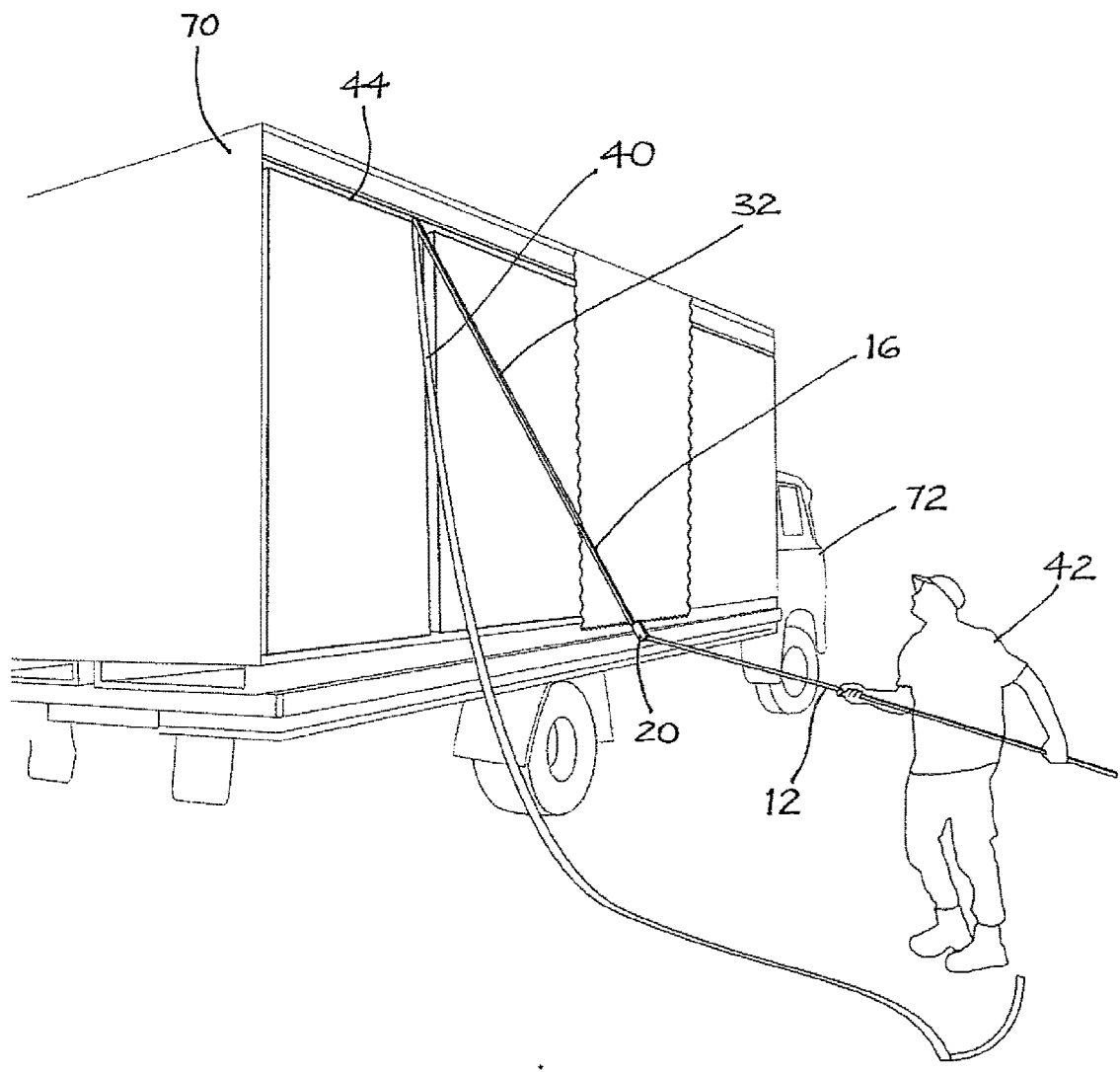
FIG. 19 is a perspective view showing an eighth step of the load strapping procedure.
Figure 20:
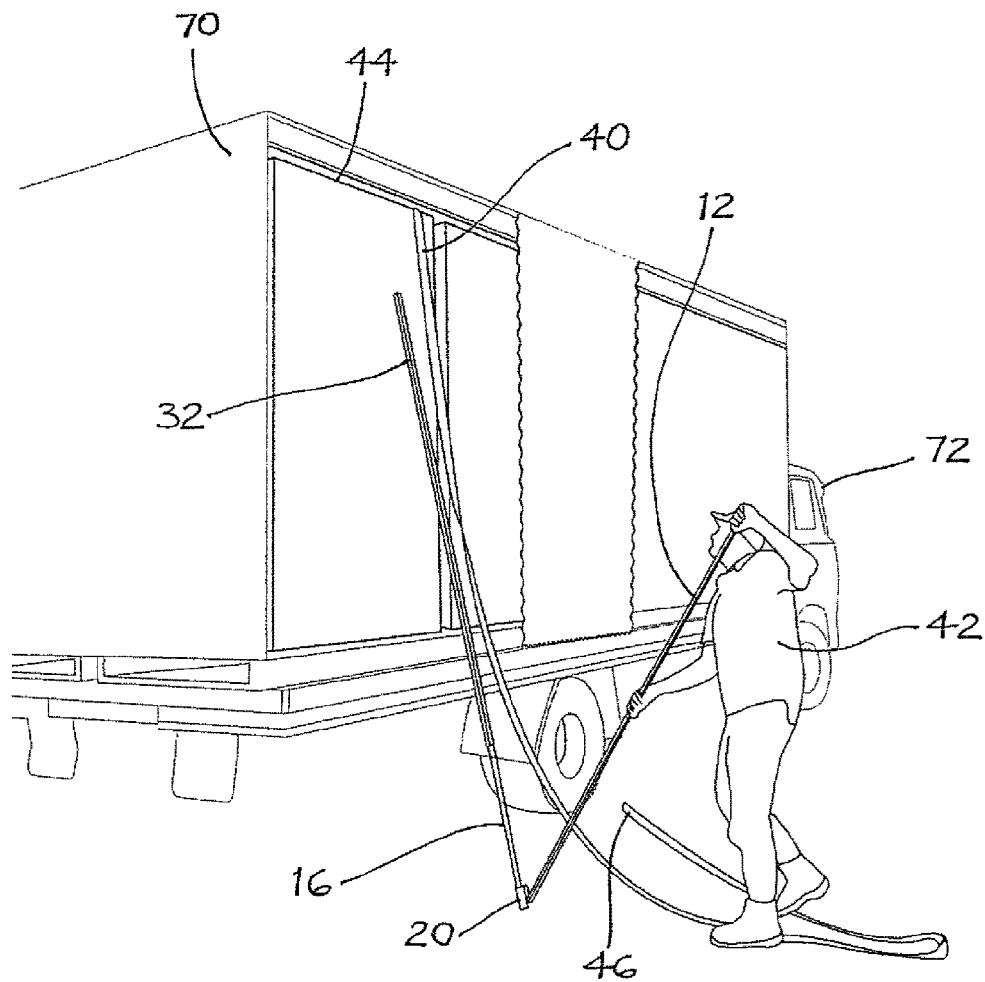
FIG. 20 is a perspective view showing a ninth step of the load strapping procedure.

The device 30, 30a can be manipulated by a user 42 to form a load strapping arrangement over a load 44 mounted inside a tautliner body 70 of a truck 72 in accordance with the following general series of steps, as shown in FIGS. 11 to 20, of a load strapping procedure. The user 42, located at one side of the load 44, grips the device 30, 30a and lifts the one end 38 of the strap 40 to a first position, as shown in FIG. 11, just above the height of the load 44. From this first position, the strap end 38, by pivotal manipulation of the elongated members 12, 16 (or pivotal arms), as shown in FIGS. 12 and 13, is then fed over the top of the load 44, as shown in FIGS. 14 and 15, until the strap end 38 reaches a second position, as shown in FIG. 16, at the other side of the load 44. The strap end 38 is then disengaged from the strap end receiving assembly 22 by the user 42 rotating the first elongated member 12, with the second and third elongated members 16, 32 serving as the axis of rotation, partly in a clockwise direction, as shown in FIG. 17, so that the strap end 38 slips off the strap end receiving assembly 22. The device 30, 30a is then withdrawn from the top of the load, as shown in FIGS. 18 and 19. This allows the strap end 38 and another end 46 of the strap 40, which strap end 46 is still located at the same side of the load as the user 42, to be securely attached to respective anchor points (not shown) for strapping over the load 44. Alternatively, the other strap end 46 may be connected to a ratchet which is already anchored to the body 70 of the truck 72. The device 30, 30a is manipulated, as shown in FIG. 20, so as to return to a flat packed storage configuration, as shown in FIGS. 2A, 2B, to be available for re-use.

The above described device 30, 30a may take the form of various embodiments. In one such embodiment, the third elongated member 32 is telescopically extendible to the extended position by sliding over the second elongated member 16.

In another embodiment of the device 30, 30a, the extension lock assembly 34 has a first aperture 48 in the second elongated member 16, and a second aperture 50 in the third elongated member 32, and a pin 52 which, when the device is in use, is located through both the first aperture 48 and the second aperture 50 for removably locking the third elongated member 32 in the extended position.

In yet another embodiment of the device 30, 30a the pin 52 is a dowel pin, or alternatively is a quick release pin, that is insertable into, and removable from, both of the first and second apertures 48, 50. When inserted through these apertures 48, 50, the dowel pin 52 is secured in position by an R-shaped spring clip 54 engaged within a hole 56 extending laterally through the pin 52.

Alternatively, and as shown in FIGS. 3B, 6B, 21 to 23 and 24 to 26 of still another embodiment 60, 60a of the load strapping device, the pin is a spring movable lock pin 62 which is secured to the second elongated member 16 and is extended outwardly through the first aperture 48 when the pin 62 is under spring tension, and is retracted inwardly from the first aperture 48 when the pin 62 is under spring compression exerted by a pressure applied by the third elongated member 32 on the pin 62. The pin 62, when the device is in use, projects outwardly through the second aperture 50 for removably locking the third elongated member 32 in the extended position.

The third elongated member 32 of the device 60, 60a has a plurality of regularly spaced apart, second apertures 50a, 50b, 50c and 50, and the second aperture 50 through which the pin 62, in use, projects outwardly, is a selected one of the plurality of apertures that is best suited to enable the device 60, 60a, during the load strapping procedure, to reach the desired height and to extend across the top of the load 44.

In the embodiments 10, 30, 30a, 60 and 60a of the load strapping device, the strap end receiving assembly 22 has a rod 63 connected by a threaded mounting device passing through a free end of one of the elongated members 16, 32 so as to extend perpendicularly therefrom. The rod 63 has a length sufficient to receive therearound the end 38 of the strap 40, which is a looped end.

In the embodiment 30, 30a of the load strapping device, the device 30, 30a includes a storage lock assembly 64 for at least temporarily locking the third elongated member 32 to the second elongated member 16 in the flat packed storage configuration shown in FIG. 2A, 2B.

The storage lock assembly 64 has a storage lock aperture 66 located at the second end 18 of the second elongated member 16, the second aperture 50 located at the end of the third elongated member 32 adjacent to the pivot assembly 20, and the dowel pin 52 which, when the device is not in use, is located through both the storage lock aperture 66 and the second aperture 50. The R-shaped spring clip 54 secures the dowel pin 52 in position in a manner as described earlier for the extension lock assembly 34.

In the embodiment 60, 60a of the load strapping device, the spring movable lock pin 62 of the device 60, 60a serves to at least temporarily lock the third elongated member 32 to the second elongated member 16 in the flat packed storage configuration shown in FIGS. 21, 24.

The use of the load strapping device 30, 30a, 60, 60a will now be described having particular regard to the specific series of steps shown in the drawings.

Figure 3A:
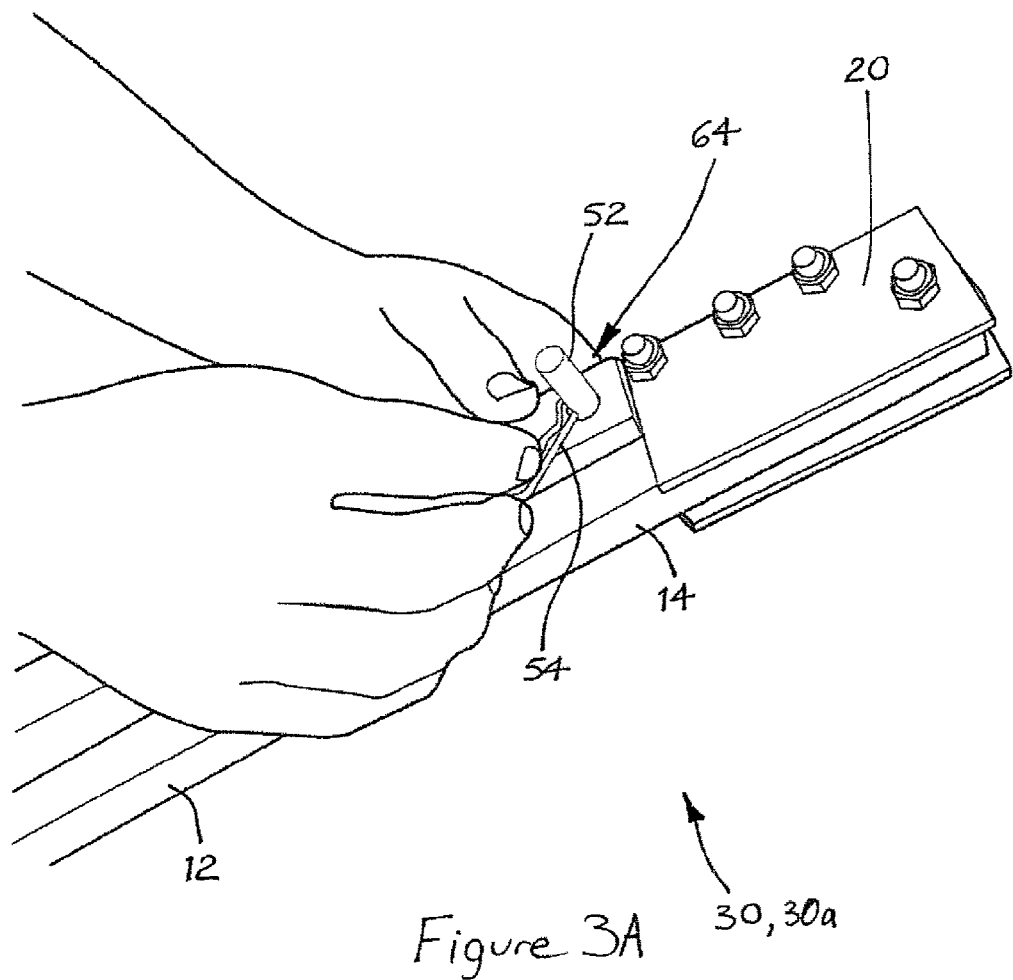
FIG. 3A is an enlarged perspective view of a pivot portion of the device shown in FIGS. 2A, 2B in which a storage lock assembly is being unlocked.
Figure 3B:
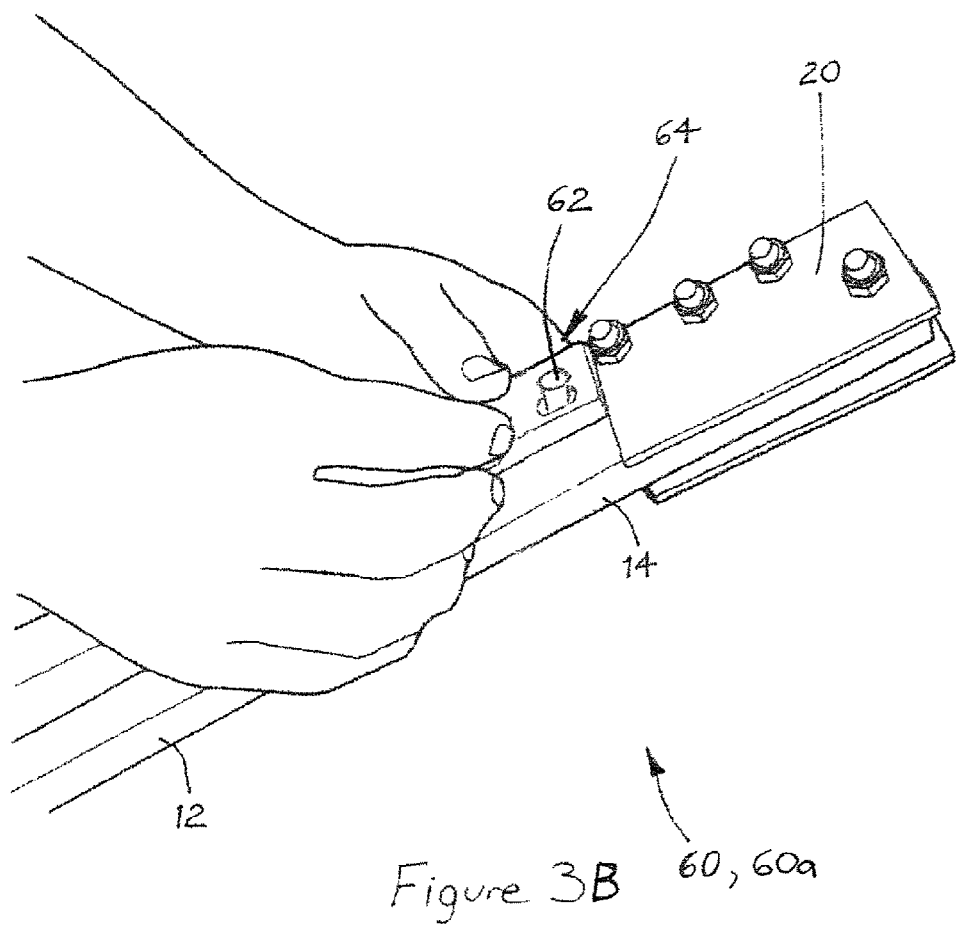
FIG. 3B is an enlarged perspective view of a pivot portion of a device according to another embodiment of the present invention showing an alternative storage lock assembly.

To unlock the device 30, 30a from its flat packed storage configuration shown in FIGS. 2A, 2B, where the third elongated member 32 is locked to the second elongated member 16, a user first removes the R-shaped spring clip 54 from the dowel pin 52, as shown in FIG. 3A, and then the pin 52 is removed from both the storage lock aperture 66 and the second aperture 50. To similarly unlock the device 60, 60a from its flat packed storage configuration shown in FIGS. 21, 24, a user presses down on the pin 62 (see FIG. 3B) so that it no longer projects outwardly through the second aperture 50.

Figure 4:
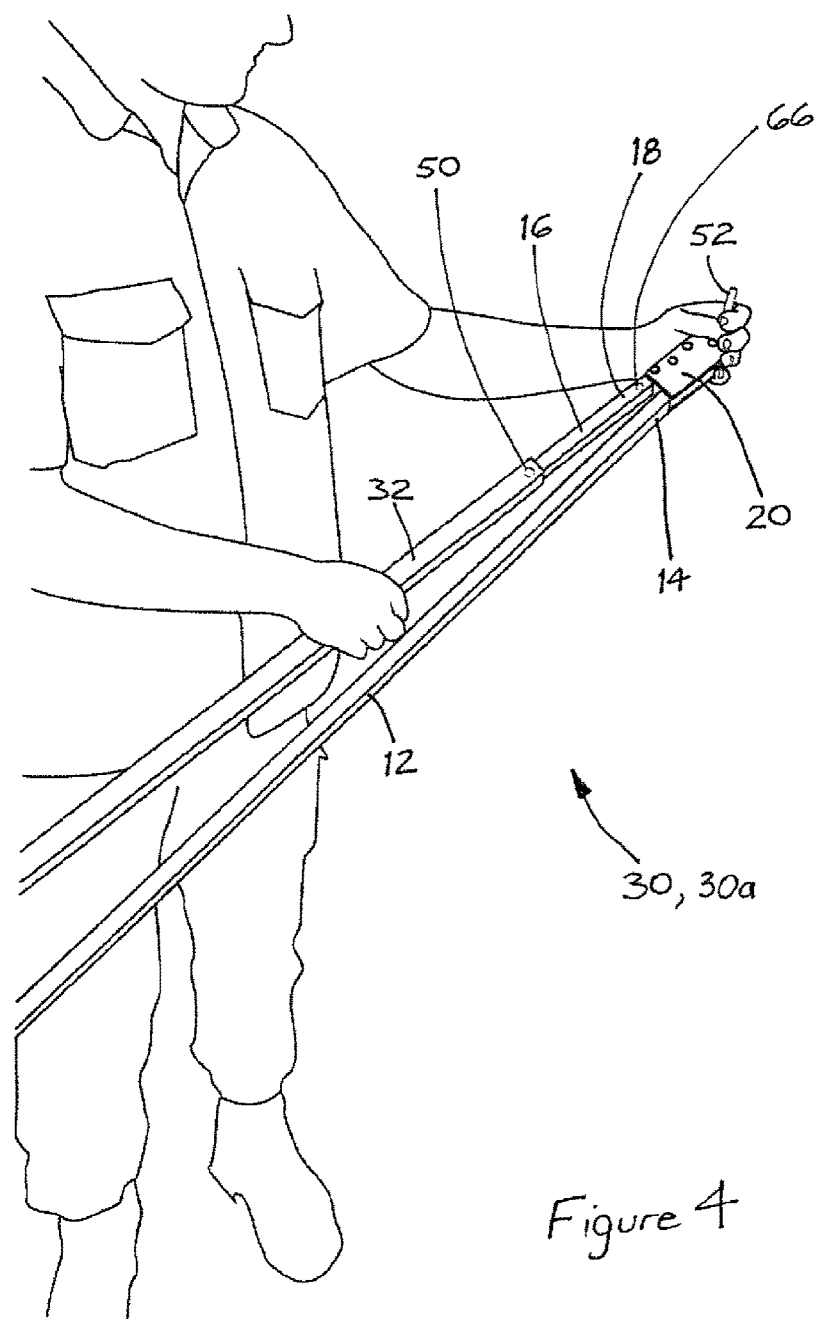
FIG. 4 is a perspective view of part of the unlocked device of FIG. 3A being extended.
Figure 5:
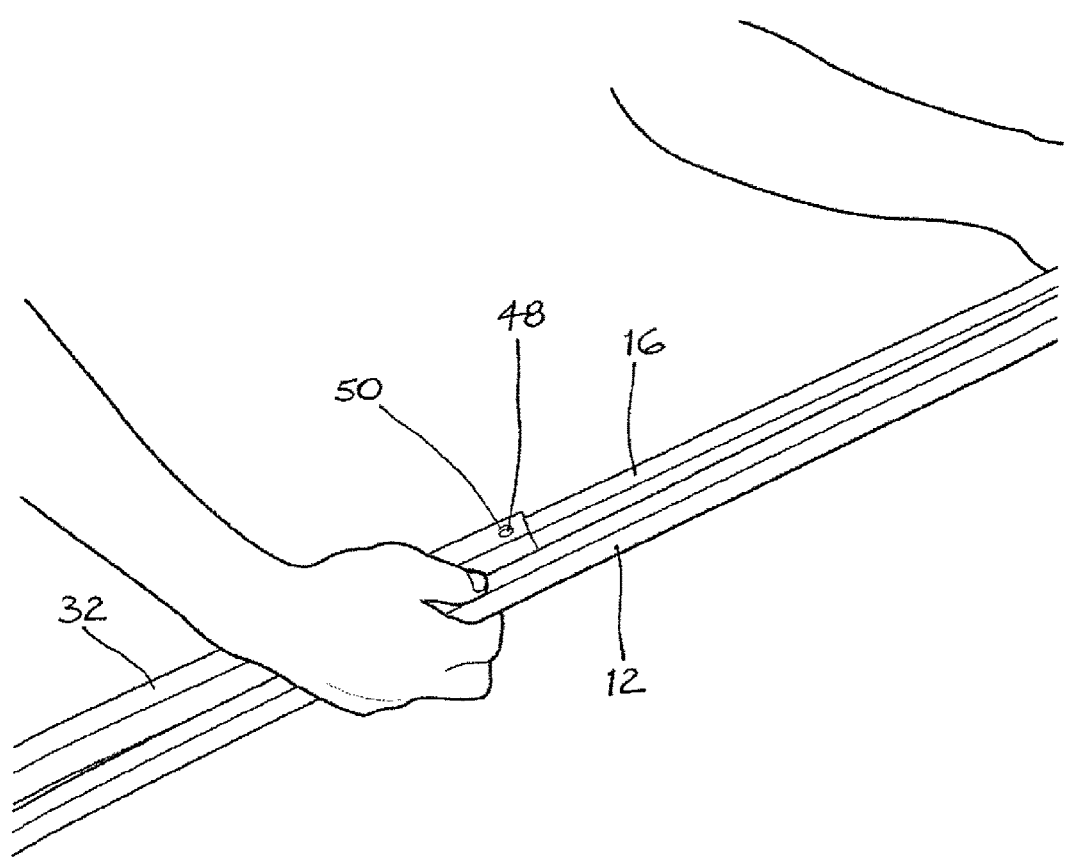
FIG. 5 is a perspective view of part of the device of FIGS. 3A, 3B after having been extended to a pre-locking extended position.
Figure 6A:
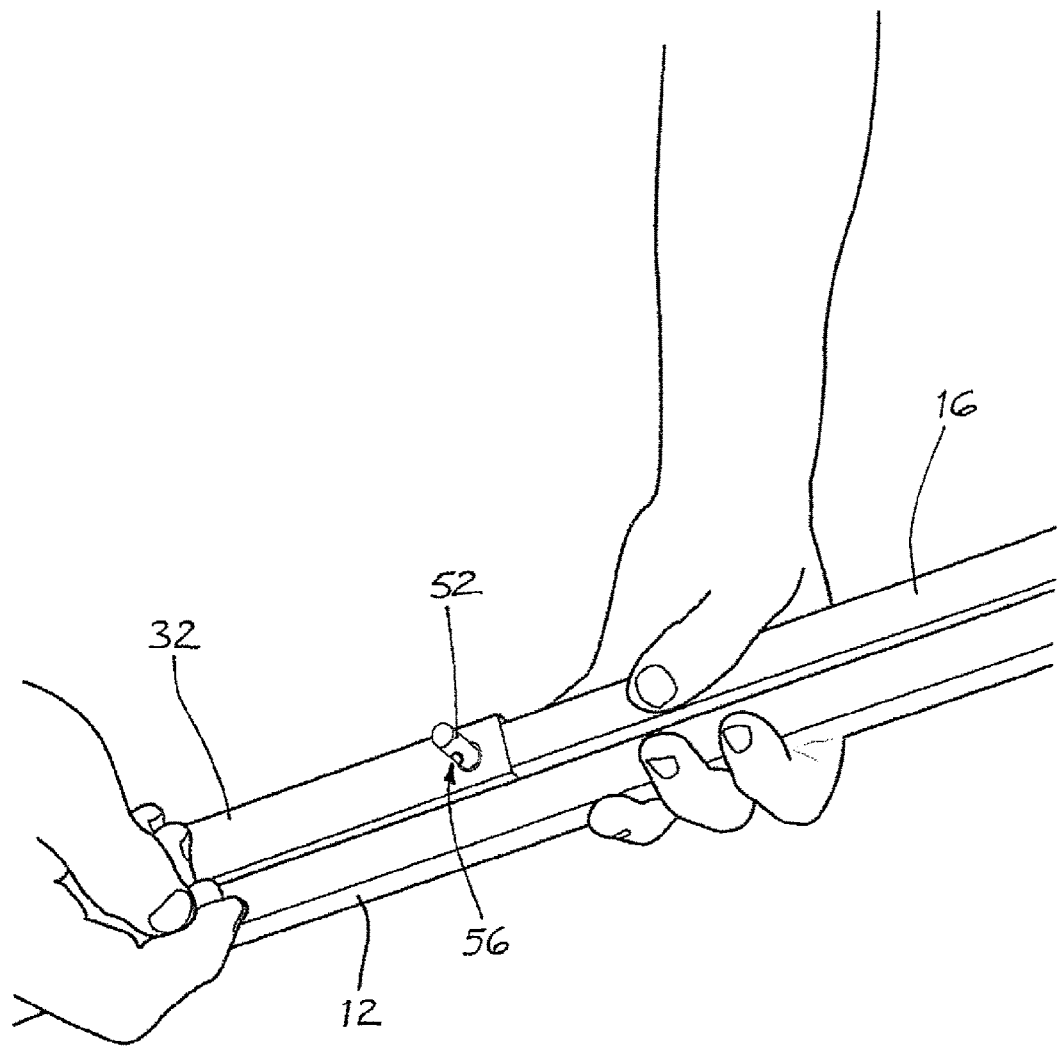
FIG. 6A is a perspective view of part of the device of FIG. 3A in a stage of being locked in the extended position.
Figure 6B:
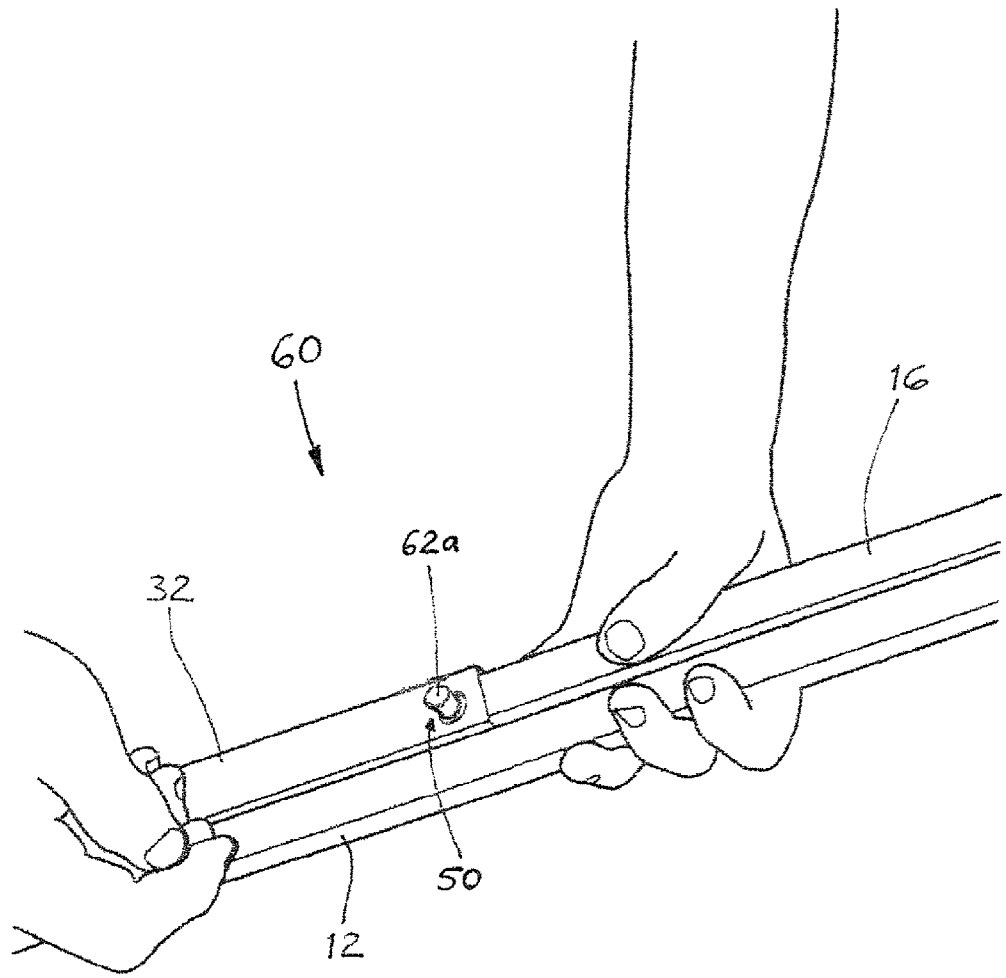
FIG. 6B is a perspective view of part of the device of FIG. 3B in a stage of being locked in the extended position.
Figure 7:
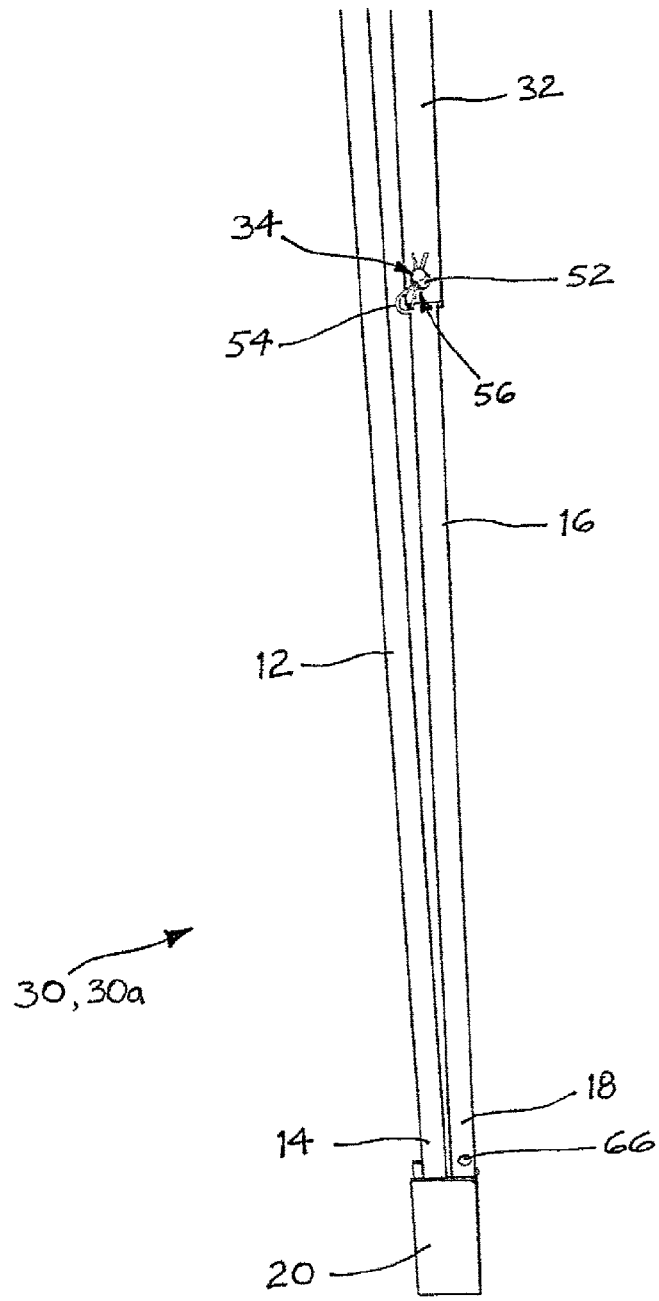
FIG. 7 is a perspective view of part of the device of FIG. 6A after having been locked in the extended position, and in which the device is ready to receive an end of a strap for use in strapping a load at heights.
Figure 8A:
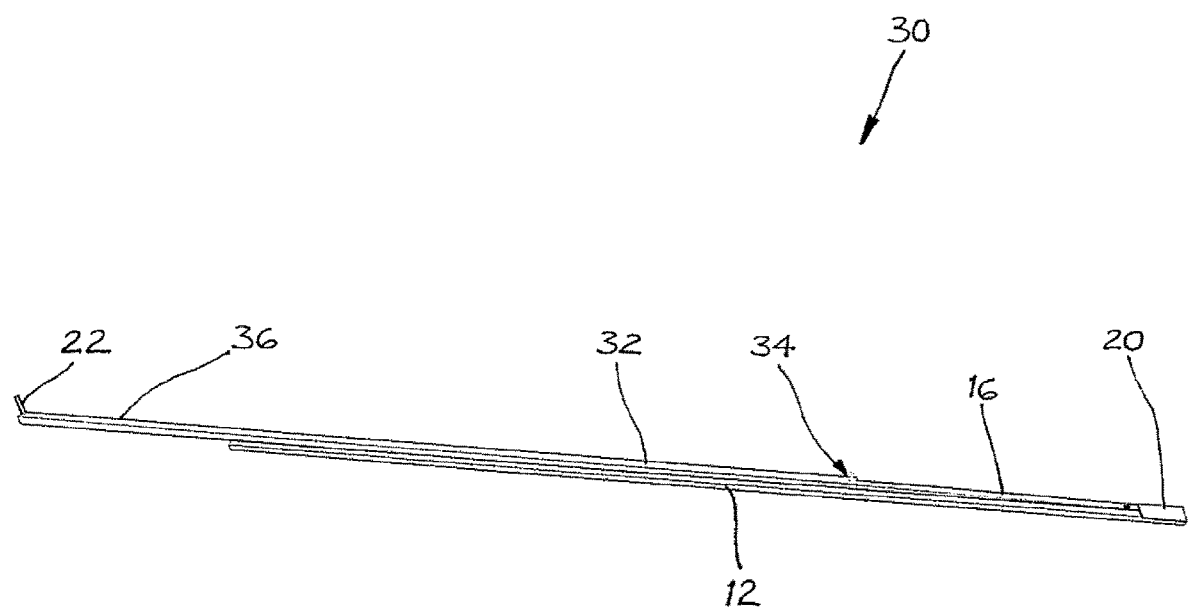
FIG. 8A is a perspective view of the entire device of FIG. 7 in the extended position.
Figure 8B:
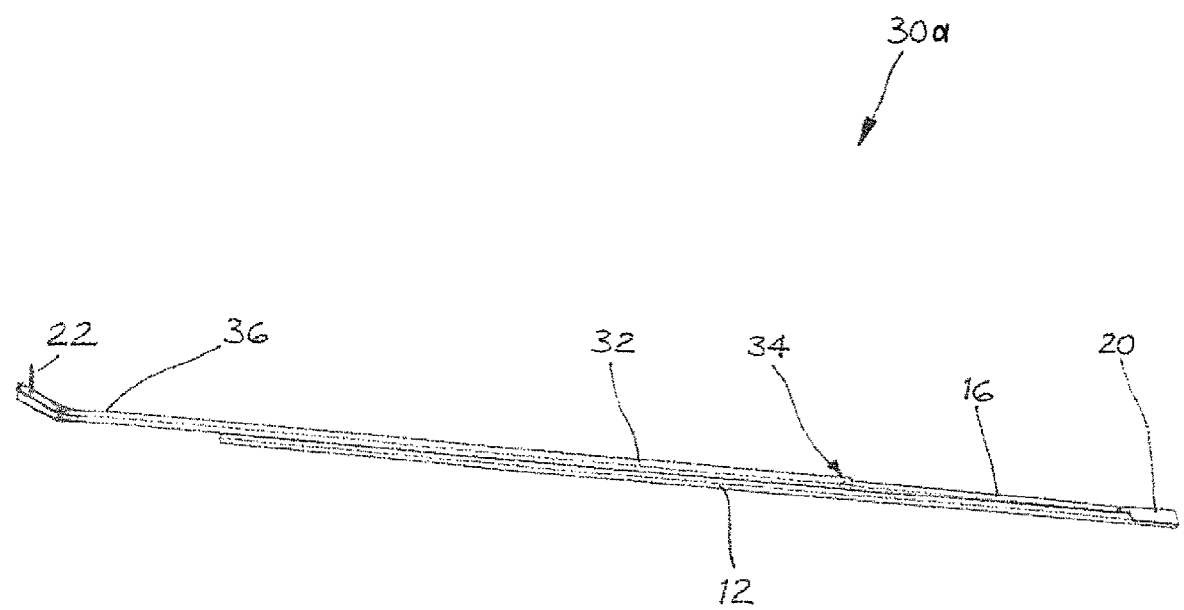
FIG. 8B is a perspective view of the entire device of FIG. 26 in the extended position.

The user then slides the third elongated member 32 over the second elongated member 16 away from the pivot assembly 20, as shown in FIG. 4, until the third elongated member 32 reaches a pre-locking extended position, as shown in FIG. 5, where the first aperture 48 in the second elongated member 16 is axially aligned with the second aperture 50 in the third elongated member 32. For the device 30, 30a, the dowel pin 52 is then inserted into both the first and second apertures 48, 50, as shown in FIG. 6A, and the R-shaped spring clip 54 secures the dowel pin 52 in position so that the third elongated member 32 is removably locked in the extended position, as shown in FIGS. 7, 8A and 8B, where the device 30, 30a is ready to receive an end of a strap for use in strapping a load at heights. For the device 60, 60a, another spring movable lock pin 62a springs upwardly through the second aperture 50 in the third elongated member 32 to removably lock that member 32 in the extended position, as shown in FIG. 6B.

Figure 9A:
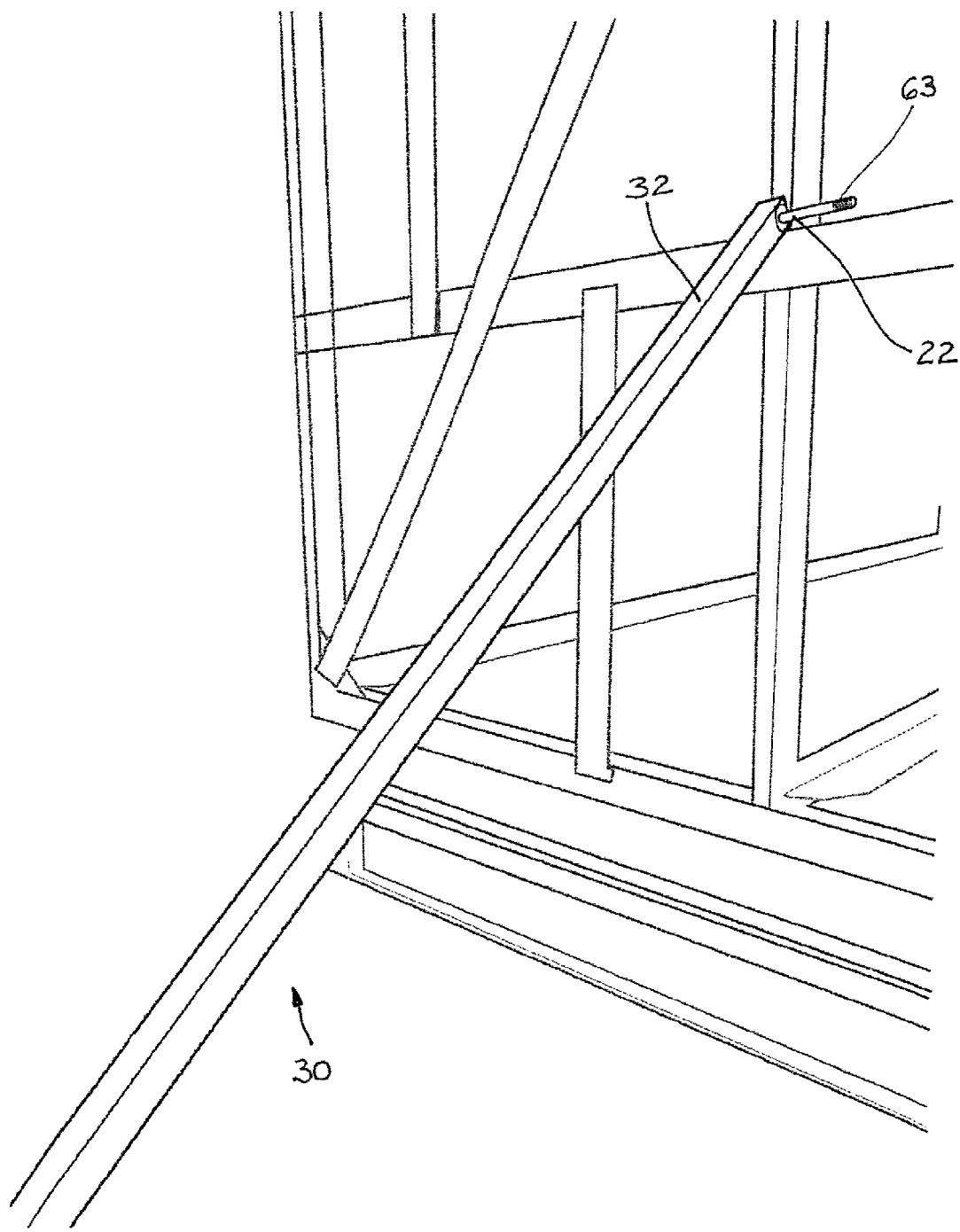
FIG. 9A is an enlarged perspective view of a strap end receiving portion of the device shown in FIG. 8A adjacent to a load to be strapped.
Figure 9B:
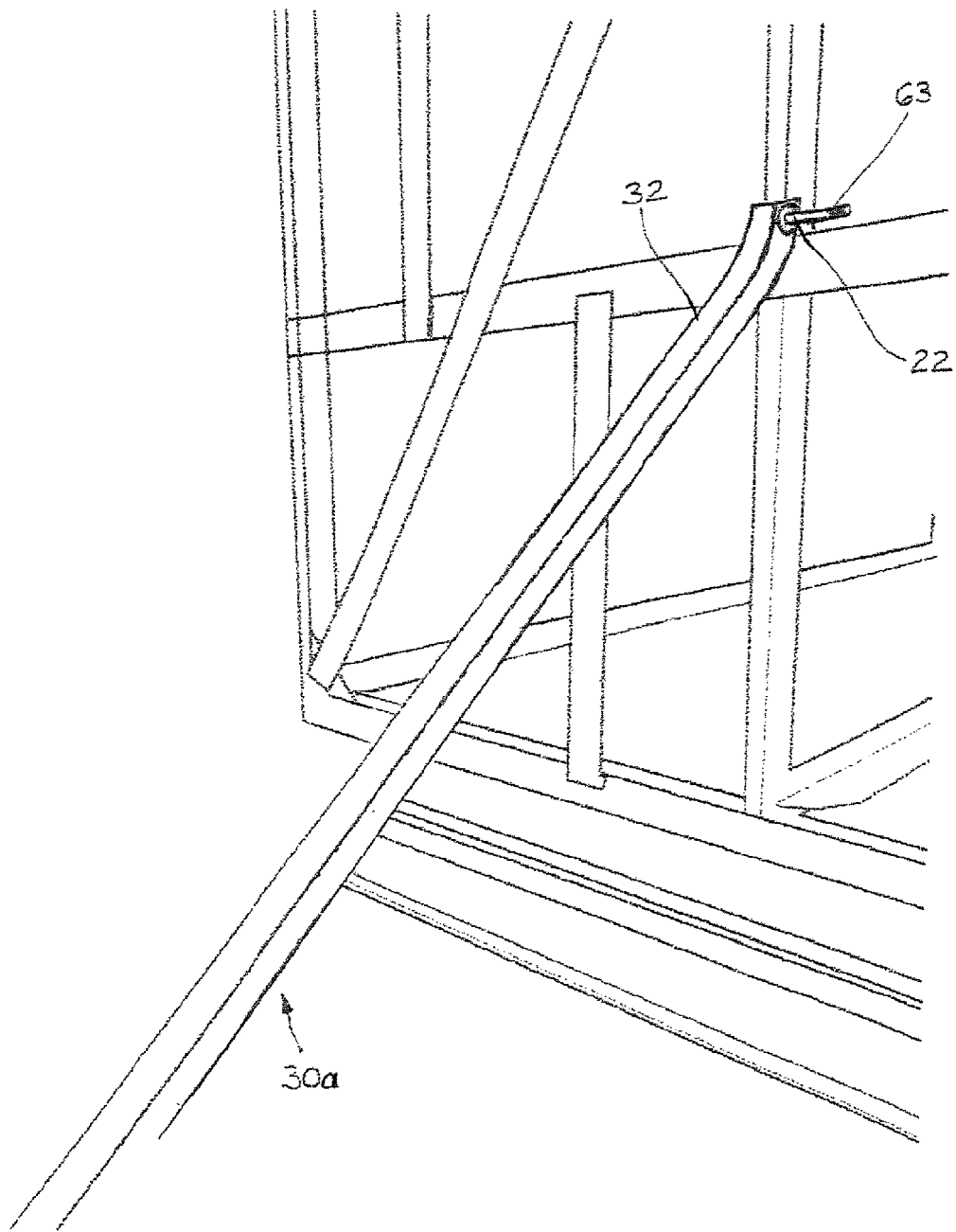
FIG. 9B is an enlarged perspective view of a strap end receiving portion of the device shown in FIG. 8B adjacent to a load to be strapped.

The strap end receiving assembly 22 of the device 30, 30a, 60, 60a as shown in FIGS. 9A, 9B, receives the looped end 38 of the strap 40 around the rod 63, as shown in FIGS. 10A, 10B. The looped strap end 38 also has a ring 68, hook or clamp attached thereto which is used for engaging the looped strap end 38 to an anchor point for strapping over the load. It will be well understood by persons skilled in the art that there are many different ways of attaching a strap end to a strap end receiving part of a load strapping device according to this invention.

As shown in FIG. 11, a user 42, standing at one side of a load 44 which is mounted inside the tautliner body 70 of a truck 72, grips the device 30, 30a, 60, 60a and raises it so as to lift the looped strap end 38 of the strap 40 to a first position just above the height of the load 44.

From this first position, the looped strap end 38, by pivotal manipulation of the elongated members 12, 16 (or pivotal arms), as shown in FIGS. 12 and 13, is then fed over the top of the load 44, as shown in FIGS. 14 and 15, until the looped strap end 38 reaches a second position, as shown in FIG. 16, at the other side of the load 44.

The looped strap end 38 is then disengaged from the strap end receiving assembly 22 by the user 42 rotating the first elongated member 12, with the second and third elongated members 16, 32 serving as the axis of rotation, partly in a clockwise direction, as shown in FIG. 17, so that the strap end 38 slips off the strap end receiving assembly 22. The device 30, 30*a*, 60, 60*a* is then withdrawn from the top of the load 44, as shown in FIGS. 18 and 19.

This allows the looped strap end 38 and another end 46 of the strap 40, which end 46 is still located at the same side of the load 44 as the user 42, to be securely attached to respective anchor points (not shown) for strapping over the load 44. Alternatively, the other strap end 46 may be connected to a ratchet which is already anchored to the body 70 of the truck 72.

The device 30, 30*a*, 60, 60*a* is manipulated, as shown in FIG. 20, so as to return to a flat packed storage configuration, as shown in FIGS. 2A, 2B, 21, 24 to be available for re-use.

When in the flat packed storage configuration, the devices 10, 30, 30*a*, 60, 60*a* are able to fit, from side to side, within the body of a truck. As the width of truck bodies vary, the load strapping devices of the present invention can be manufactured to have lengths which can be accommodated within these various truck body widths.

The device of the present invention can be made from electrically insulating or non-conductive material to avoid danger arising when working close to overhead electrical wiring.

It will be readily apparent to persons skilled in the art that various modifications may be made in details of design and construction of the load strapping device, and in the steps of using the load strapping device, as described above, without departing from the scope or ambit of the present invention.

The invention claimed is:

1. A load strapping device, comprising:
    (a) a first elongated member having a first end,
    (b) a second elongated member having a second end,
    (c) a pivot assembly interconnecting the first and second ends,
    (d) a third elongated member telescopically extendible along a longitudinal axis of the third elongated member from the second elongated member to an extended position remote of the pivot assembly,
    (e) an extension lock assembly for at least temporarily locking the third elongated member in the extended position, and
    (f) a strap end receiving assembly connected to a free end of the third elongated member, the strap end receiving assembly comprising a rod extending from the third elongated member, the extension of the rod from the third elongate member being perpendicular to the longitudinal axis of the third elongated member, the rod having a length sufficient to receive therearound a looped end of a strap,
    wherein, for use, one end of the strap is engaged to the strap end receiving assembly, wherein a load strapping arrangement over a load is formed when a user, located at one side of the load, grips the device and lifts the one end of the strap to a first position just above the height of the load, from where the one end of the strap, by pivotal manipulation of the elongated members, is then fed over the top of the load until the one end of the strap reaches a second position at the other side of the load, whereafter the one end of the strap is disengaged from the strap end receiving assembly and the device is withdrawn from the top of the load to allow the one end of the strap and another end of the strap to be securely attached to respective anchor points for strapping over the load, and wherein, for use, the third elongated member is removably locked in the extended position.

2. The load strapping device of claim 1, wherein the third elongated member is telescopically extendible to the extended position by sliding over the second elongated member.

3. The load strapping device of claim 1, wherein the extension lock assembly comprises a first aperture in the second elongated member, at least one second aperture in the third elongated member, and a pin which, in use, is located through both the first aperture and the, or a selected, second aperture for removably locking the third elongated member in the extended position.

4. The load strapping device of claim 3, wherein the pin is a quick release pin or a dowel pin that is insertable into, and removable from, both of the first and second apertures, and when inserted through both of the first and second apertures is secured in position by an R-shaped spring clip engaged within a hole extending laterally within the pin.

5. The load strapping device of claim 3, wherein the pin is a spring movable lock pin which is secured to the second elongated member and is extended outwardly through the first aperture when the pin is under spring tension, and is retracted inwardly from the first aperture when the pin is under spring compression exerted by a pressure applied by the third elongated member on the pin, and wherein the pin projects outwardly through the, or a selected, second aperture for removably locking the third elongated member in the extended position.

6. The load strapping device of claim 3, wherein there is a plurality of second apertures which are regularly spaced apart in the third elongated member.

7. A device for use in strapping a load at heights, the device comprising:
    (a) a first elongated member having a first end,
    (b) a second elongated member having a second end,
    (c) a pivot assembly interconnecting the first and second ends,
    (d) a third elongated member telescopically extendible from the second elongated member to an extended position remote of the pivot assembly, a distance between a free end of the third elongated member and the second end of the second elongated member increasing as the third elongated member telescopically extends from the second elongated member to the extended position, the distance between free end of the third elongated member and the second end of the second elongated member being selected in response to a dimension of the load that is perpendicular to a height of the load;
    (e) an extension lock assembly for at least temporarily locking the third elongated member in the extended position, and
    (f) a strap end receiving assembly connected to a free end of the third elongated member,
    wherein, for use, the third elongated member is locked in the extended position, and one end of a strap is engaged to the strap end receiving assembly, and wherein a load strapping arrangement over a load is formed when a user, located at one side of the load, grips the device and lifts the one end of the strap to a first position just above the height of the load, from where the one end of the strap, by pivotal manipulation of the elongated members, is then fed over the top of the load until the one end of the strap reaches a second position at the other side of the load, whereafter the one end of the strap is disengaged from the strap end receiving assembly and the device is withdrawn from the top of the load to allow the one end of the strap and another end of the strap to be securely attached to respective anchor points for strapping over the load.

8. The load strapping device of claim 7, wherein the third elongated member is telescopically extendible to the extended position by sliding over the second elongated member.

9. The load strapping device of claim 7, wherein the extension lock assembly comprises a first aperture in the second elongated member, at least one second aperture in the third elongated member, and a pin which, in use, is located through both the first aperture and the, or a selected, second aperture for removably locking the third elongated member in the extended position.

10. The load strapping device of claim 9, wherein the pin is a quick release pin or a dowel pin that is insertable into, and removable from, both of the first and second apertures, and when inserted through both of the first and second apertures is secured in position by an R-shaped spring clip engaged within a hole extending laterally within the pin.

11. The load strapping device of claim 9, wherein the pin is a spring movable lock pin which is secured to the second elongated member and is extended outwardly through the first aperture when the pin is under spring tension, and is retracted inwardly from the first aperture when the pin is under spring compression exerted by a pressure applied by the third elongated member on the pin, and wherein the pin projects outwardly through the, or a selected, second aperture for removably locking the third elongated member in the extended position.

12. The load strapping device of claim 9, wherein there is a plurality of second apertures which are regularly spaced apart in the third elongated member.

13. The load strapping device of claim 7, wherein the strap end receiving assembly comprises a rod extending perpendicularly from a longitudinal axis of the third elongated member, the rod having a length sufficient to receive therearound a looped end of the strap.

14. A load strapping device, comprising:
(a) a first elongated member having a first end,
(b) a second elongated member having a second end,
(c) a pivot assembly interconnecting the first and second ends,
(d) a third elongated member telescopically extendible from the second elongated member to an extended position remote of the pivot assembly,
(e) an extension lock assembly for at least temporarily locking the third elongated member in the extended position, the extension lock assembly comprising a first aperture in the second elongated member, at least one second aperture in the third elongated member, and a pin which, in use, is located through both the first aperture and the, or a selected, second aperture for removably locking the third elongated member in the extended position, the pin being a quick release pin or a dowel pin that is insertable into, and removable from, both of the first and second apertures, and when inserted through both of the first and second apertures is secured in position by an R-shaped spring clip engaged within a hole extending laterally within the pin, and
(f) a strap end receiving assembly connected to a free end of the third elongated member,
wherein, for use, one end of a strap is engaged to the strap end receiving assembly,
wherein a load strapping arrangement over a load is formed when a user, located at one side of the load, grips the device and lifts the one end of the strap to a first position just above the height of the load, from where the one end of the strap, by pivotal manipulation of the elongated members, is then fed over the top of the load until the one end of the strap reaches a second position at the other side of the load, whereafter the one end of the strap is disengaged from the strap end receiving assembly and the device is withdrawn from the top of the load to allow the one end of the strap and another end of the strap to be securely attached to respective anchor points for strapping over the load, and
wherein, for use, the third elongated member is removably locked in the extended position.

15. The load strapping device of claim 14, wherein the pin is the dowel pin.

16. The load strapping device of claim 14, wherein the third elongated member is telescopically extendible to the extended position by sliding over the second elongated member.

17. The load strapping device of claim 14, wherein there is a plurality of second apertures which are regularly spaced apart in the third elongated member.

\* \* \* \* \*